(12) United States Patent
Sealy et al.

(10) Patent No.: US 9,948,145 B2
(45) Date of Patent: Apr. 17, 2018

(54) WIRELESS POWER TRANSFER FOR A SEAT-VEST-HELMET SYSTEM

(71) Applicant: WiTricity Corporation, Watertown, MA (US)

(72) Inventors: Kylee D. Sealy, Logan, UT (US); Volkan Efe, Watertown, MA (US); Susan M. Patterson, Holliston, MA (US); Ryan J. Bohm, Logan, UT (US); Morris P. Kesler, Bedford, MA (US)

(73) Assignee: WiTricity Corporation, Watertown, MA (US)

( * ) Notice: Subject to any disclaimer, the term of this patent is extended or adjusted under 35 U.S.C. 154(b) by 259 days.

(21) Appl. No.: 14/587,597

(22) Filed: Dec. 31, 2014

(65) Prior Publication Data

US 2015/0115733 A1    Apr. 30, 2015

Related U.S. Application Data

(63) Continuation-in-part of application No. 13/544,688, filed on Jul. 9, 2012.

(Continued)

(51) Int. Cl.
*H02J 50/12* (2016.01)
*H02J 17/00* (2006.01)
(Continued)

(52) U.S. Cl.
CPC ............. *H02J 50/12* (2016.02); *H02J 7/025* (2013.01); *H02J 17/00* (2013.01); *H02J 50/10* (2016.02);
(Continued)

(58) Field of Classification Search
CPC .................................. H02J 50/12; H02J 50/90
See application file for complete search history.

(56) References Cited

U.S. PATENT DOCUMENTS

| 645,576 A | 3/1900 | Tesla |
|---|---|---|
| 649,621 A | 5/1900 | Tesla |

(Continued)

FOREIGN PATENT DOCUMENTS

| CA | 142352 | 8/1912 |
|---|---|---|
| CN | 102239633 | 11/2011 |

(Continued)

OTHER PUBLICATIONS

"Intel CTO Says Gap between Humans, Machines Will Close by 2050", *Intel News Release*, (See intel.com/.../20080821comp.htm?iid=S . . . ) (Printed Nov. 6, 2009).

(Continued)

*Primary Examiner* — Fritz M Fleming
(74) *Attorney, Agent, or Firm* — Fish & Richardson P.C.

(57) ABSTRACT

Wireless power transfer system include: a seat configured to support a human and including a first resonator featuring a conductive coil formed by a plurality of loops that each encircle a common first axis, a layer of magnetic material, and a conductive shield; an article of clothing featuring a second resonator having a conductive coil formed by a plurality of loops that each encircle a common second axis, so that when the article of clothing is worn by the human and the human is seated in the seat, the first and second axes are aligned; and a first electronic apparatus positioned in the seat and coupled to the first resonator, and configured to deliver electrical power to the first resonator so that during operation of the system, power is transferred wirelessly from the first resonator to the second resonator.

20 Claims, 36 Drawing Sheets

Related U.S. Application Data

(60) Provisional application No. 61/922,406, filed on Dec. 31, 2013, provisional application No. 62/043,320, filed on Aug. 28, 2014, provisional application No. 61/505,593, filed on Jul. 8, 2011.

(51) Int. Cl.
    *H02J 7/02* (2016.01)
    *H02J 50/70* (2016.01)
    *H02J 50/10* (2016.01)
    *A42B 3/04* (2006.01)
    *H02J 50/50* (2016.01)

(52) U.S. Cl.
    CPC ............ *H02J 50/70* (2016.02); *A42B 3/0406* (2013.01); *H02J 50/50* (2016.02)

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hillman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |

(56) References Cited

U.S. PATENT DOCUMENTS

| | | |
|---|---|---|
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 8,791,600 B2 | 7/2014 | Soar |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |

(56) References Cited

U.S. PATENT DOCUMENTS

| | | |
|---|---|---|
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarman et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0039828 A1* | 2/2009 | Jakubowski ............ H02J 7/025 320/106 |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |

(56) References Cited

U.S. PATENT DOCUMENTS

| | | |
|---|---|---|
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |

(56) References Cited

U.S. PATENT DOCUMENTS

| | | |
|---|---|---|
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1 | 3/2014 | Keeling |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |

(56) References Cited

FOREIGN PATENT DOCUMENTS

| | | |
|---|---|---|
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Physics Update, Unwired Energy", *Physics Today*, pp. 26, (Jan. 2007) (See http://arxiv.org/abs/physics/0611063.).

"In pictures: A year in technology", *BBC News*, (Dec. 28, 2007).

"Next Little Thing 2010 Electricity without wires", CNN Money (See money.cnn.com/galleries/2009/smallbusiness/0911/gallery.next_little_thing_2010.smb/) (dated Nov. 30, 2009).

Abe et al. "A Noncontact Charger Using a Resonant Converter with Parallel Capacitor of the Secondary Coil". IEEE, 36(2):444-451, Mar./Apr. 2000.

Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).

Aoki, T. et al., "Observation of strong coupling between one atom and a monolithic microresonator", Nature, vol. 443:671-674 (2006).

Apneseth et al. "Introducing wireless proximity switches" ABB Review Apr. 2002.

Aristeidis Karalis et al., "Efficient Wireless non-radiative mid-range energy transfer", *Annals of Physics*, vol. 323, pp. 34-48 (2008).

Baker et al., "Feedback Analysis and Design of RF Power Links for Low-Power Bionic Systems," *IEEE Transactions on Biomedical Circuits and Systems*, vol. 1(1):28-38 (Mar. 2007).

Balanis, C.A., "Antenna Theory: Analysis and Design," 3rd Edition, Sections 4.2, 4.3, 5.2, 5.3 (Wiley, New Jersey, 2005).

Berardelli, P., "Outlets Are Out", ScienceNOW Daily News, Science Now, http://sciencenow.sciencemag.org/ cgi/content/full/2006/1114/2, (Nov. 14, 2006) 2 pages.

Biever, C., "Evanescent coupling' could power gadgets wirelessly", NewScientistsTech.com, http://www. newscientisttech.com/article.ns?id=dn1 0575&print=true, (Nov. 15, 2006) 2 pages.

Borenstein, S., "Man tries wirelessly boosting batteries", (The Associated Press), USA Today, (Nov. 16, 2006) 1 page.

Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).

Boyle, A., "Electro-nirvana? Not so fast", MSNBC, http://lcosmiclog.msnbc.msn.com/_news/2007/06/08/4350760- electro-nirvana-not-so-fast, (Jun. 8, 2007) 1 page.

Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).

Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).

Budhia, M. et al.,"Development of a Single-Sided Flux Magnetic Coupler for Electric Vehicle IPT", *IEEE Transactions on Industrial Electronics*, vol. 60:318-328 (Jan. 2013).

Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.

Burri et al., "Invention Description", (Feb. 5, 2008).

Cass, S., "Air Power—Wireless data connections are common—now scientists are working on wireless power", Sponsored by IEEE Spectrum, http://spectrum.ieee.org/computing/hardware/air-power, (Nov. 2006) 2 pages.

Castelvecchi, Davide, "The Power of Induction—Cutting the last cord could resonate with our increasingly gadget dependent lives", *Science News Online*, vol. 172, No. 3, Jul. 21, 2007, 6 pages.

Chang, A., "Recharging the Wireless Way—Even physicists forget to recharge their cell phones sometimes.", PC Magazine, ABC News Internet Ventures, (Dec. 12, 2006) 1 page.

Chinaview, ,"Scientists light bulb with 'wireless electricity'",www.Chinaview.en, http://news.xinhuanet.com/english/2007-06/08/content_6215681.htm,Jun. 2007,1 page.

Cooks, G., "The vision of an MIT physicist: Getting rid of pesky rechargers", Boston.com, (Dec. 11, 2006) 1 page.

Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.

Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).

Esser et al., "A New Approach to Power Supplies for Robots", IEEE, vol. 27(5):872-875, (Sep./Oct. 1991).

Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).

Fenske et al., "Dielectric Materials at Microwave Frequencies", Applied Microwave & Wireless, pp. 92-100 (2000).

Fernandez, C. et al., "A simple dc-dc converter for the power supply of a cochlear implant", *IEEE*, pp. 1965-1970 (2003).

Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).

Fildes, J., "Physics Promises Wireless Power", (Science and Technology Reporter), BBC News, (Nov. 15, 2006) 3 pages.

(56) References Cited

OTHER PUBLICATIONS

Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Resonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs-",(Science Editor), Telegraph.co.uk, http://www. telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).

Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, "The world's first sheet-type wireless power transmission system: Will a socket be replaced by e-wall?",Public Relations Office, School of Engineering, University of Tokyo, Japan,Dec. 12, 2006,4 pages.
PRESSTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).

(56) References Cited

OTHER PUBLICATIONS

Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).

\* cited by examiner

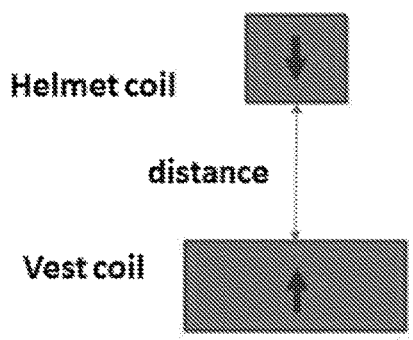
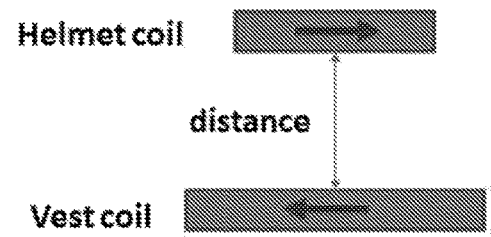
FIG. 2A　　　　　　　　FIG. 2B
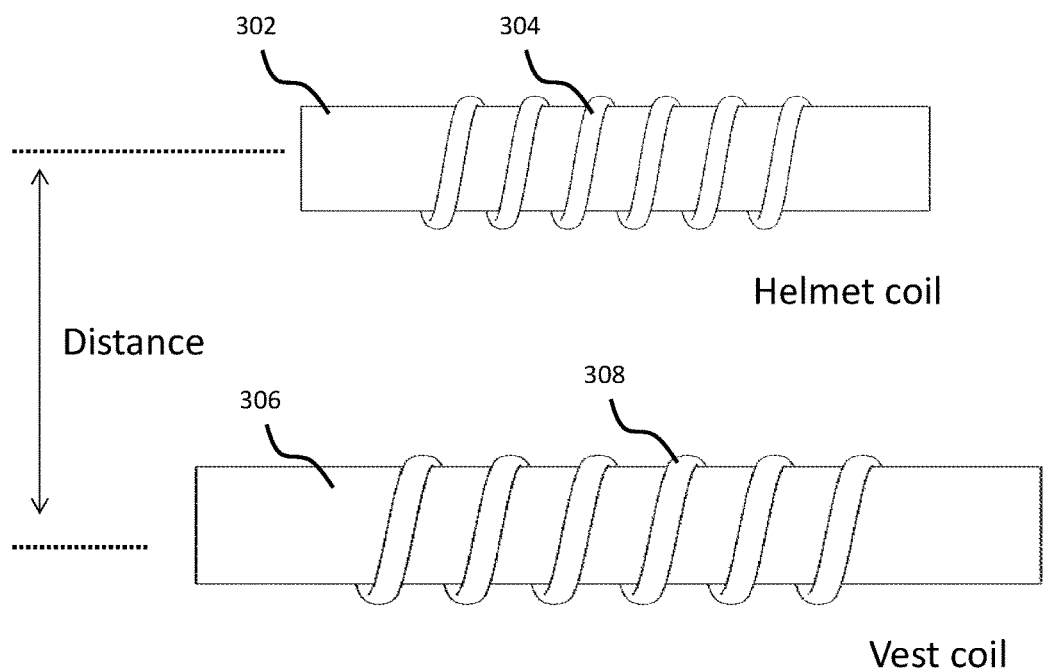
FIG. 3

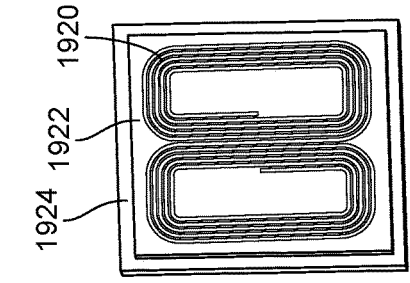
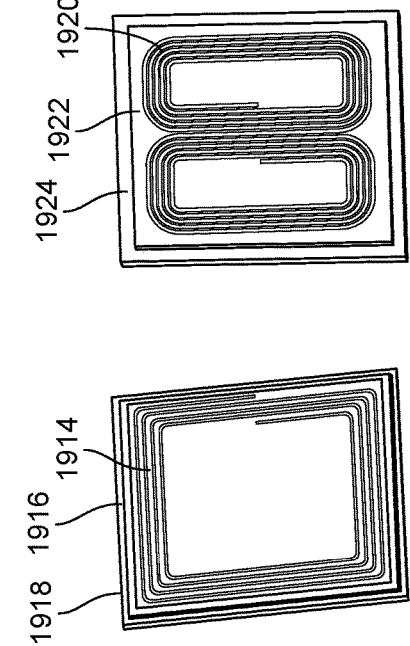
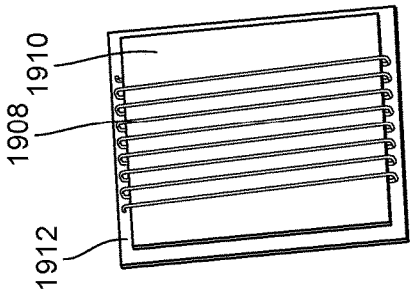
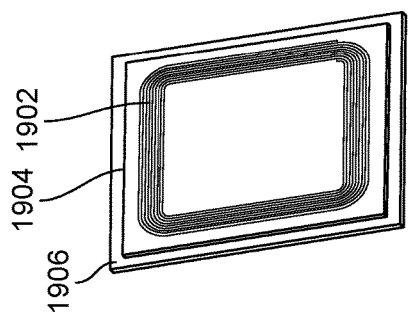
FIG. 19A  FIG. 19B  FIG. 19C  FIG. 19D
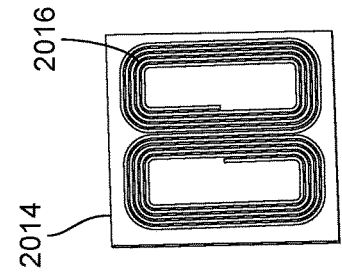
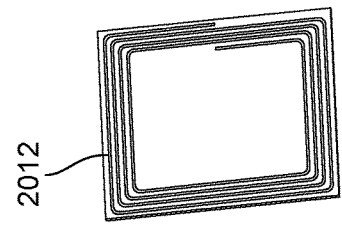
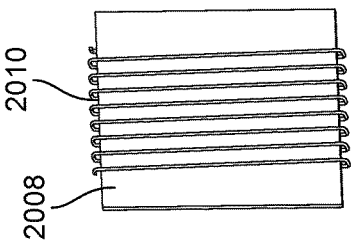
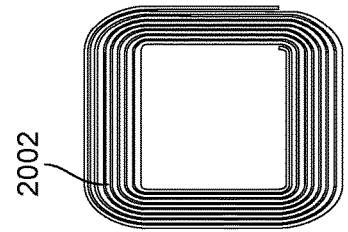
FIG. 20A  FIG. 20B  FIG. 20C  FIG. 20D  FIG. 20E

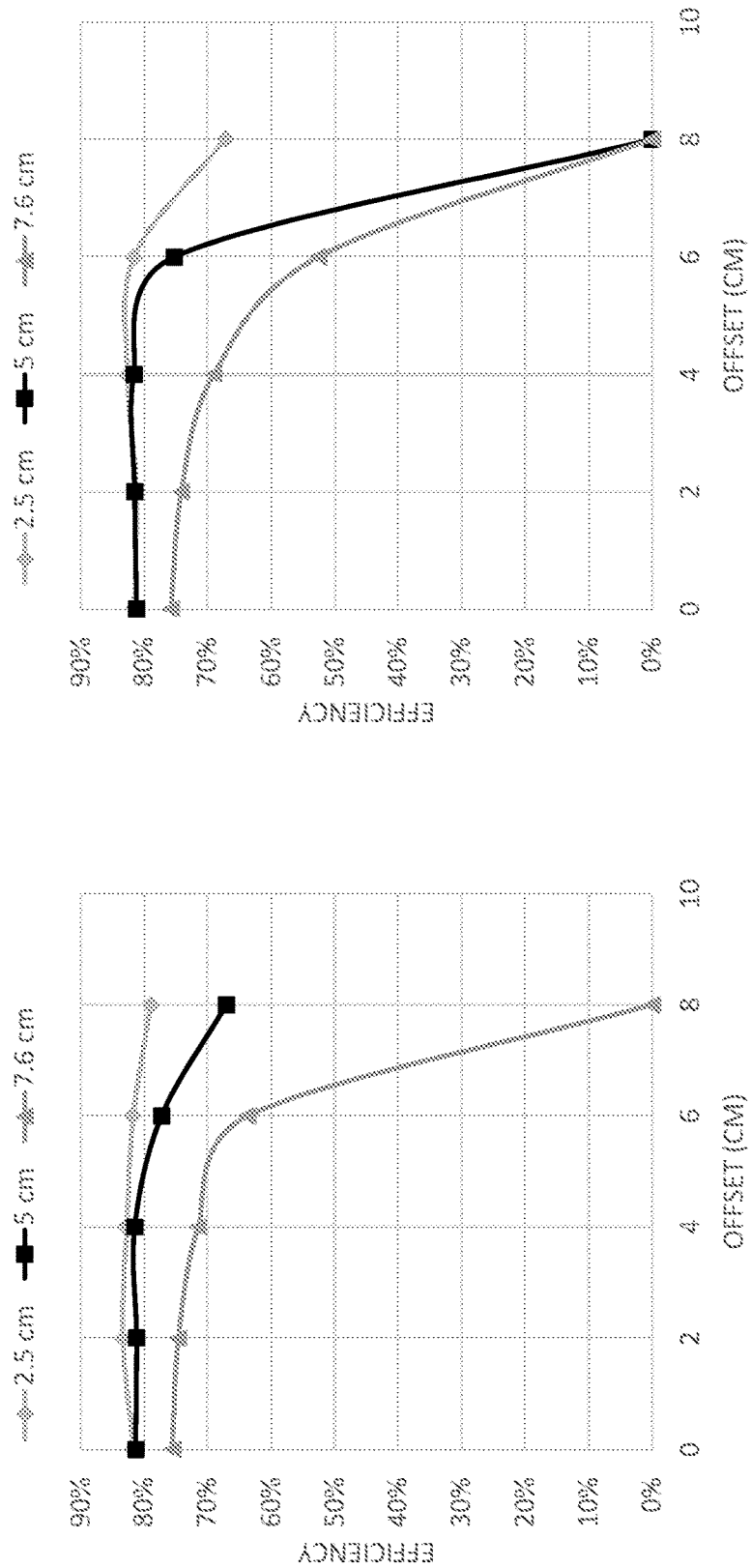

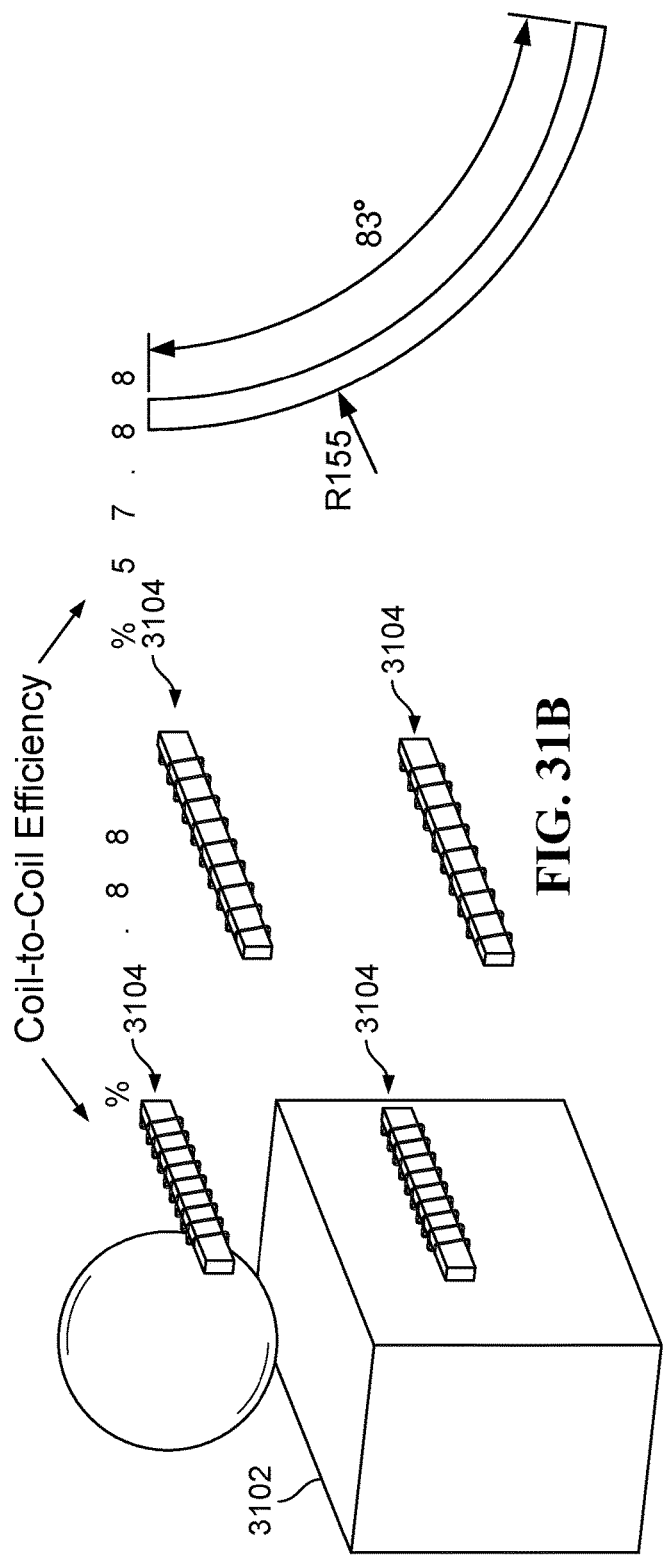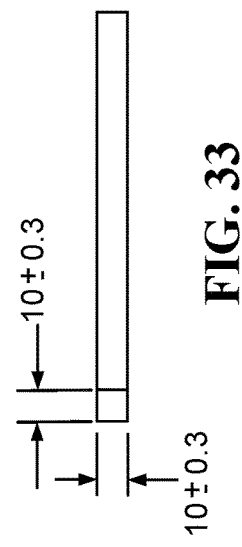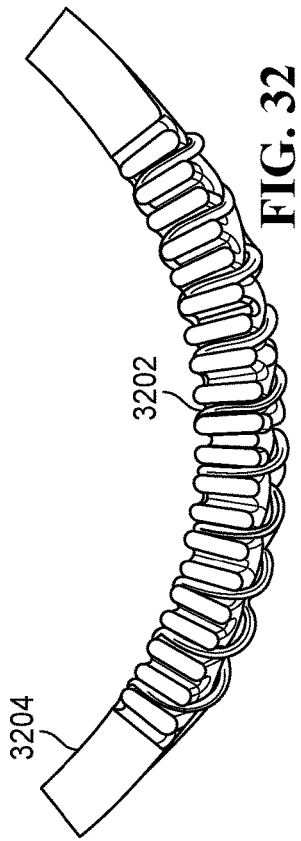

WIRELESS POWER TRANSFER FOR A SEAT-VEST-HELMET SYSTEM

CROSS REFERENCE TO RELATED APPLICATIONS

This application is a continuation-in-part of U.S. patent application Ser. No. 13/544,688, filed on Jul. 9, 2012, which claims the benefit of U.S. Provisional Application No. 61/505,593, filed on Jul. 8, 2011. This application also claims the benefit of U.S. Provisional Application No. 61/922,406, filed on Dec. 31, 2013, and U.S. Provisional Application No. 62/043,320, filed on Aug. 28, 2014. The entire contents of each of the foregoing applications are incorporated herein by reference.

TECHNICAL FIELD

This disclosure relates to wireless power transfer techniques.

BACKGROUND

Energy or power may be transferred wirelessly using a variety of known radiative, or far-field, and non-radiative, or near-field, techniques as detailed, for example, in commonly owned U.S. patent application Ser. No. 12/613,686 published on May 6, 2010 as U.S. 2010/010909445 and entitled "Wireless Energy Transfer Systems," U.S. patent application Ser. No. 12/860,375 published on Dec. 9, 2010 as 2010/0308939 and entitled "Integrated Resonator-Shield Structures," U.S. patent application Ser. No. 13/222,915 published on Mar. 15, 2012 as 2012/0062345 and entitled "Low Resistance Electrical Conductor," U.S. patent application Ser. No. 13/283,811 published on Oct. 4, 2012 as U.S. 2012/0248981 and entitled "Multi-Resonator Wireless Energy Transfer for Lighting," and U.S. patent application Ser. No. 13/534,966 published on Jan. 2, 2014 as U.S. 2014/0002012 and entitled "Wireless Energy Transfer for Rechargeable Batteries," the contents of which are incorporated by reference.

As advanced mobile communication, computing, and sensing devices become more essential, the burden of carrying, operating, and maintaining multiple batteries, fuel cells, and the like, increases. In both civilian and military scenarios, people are often required to carry and operate multiple electronic devices. One or more devices such as headlamps, portable computers, global positioning system devices (GPS), sensors, cameras, radios, flashlights, and the like may all be carried by a person. Each electronic device may require an energy source such as batteries, fuel cells, and the like to provide energy to each or a group of the devices. Large numbers of devices may mean a large number of batteries that may require management and/or monitoring by the user.

In systems where each device has its own energy source, i.e. batteries, the stored energy may be underutilized and may lead to significant or unnecessary extra weight that may need to be carried by the user. With each device or a group of devices having a separate energy source, the energy storage of each device may need to be large enough to power the device in the worst or maximum usage scenario, even if the device is typically used infrequently. As a result in many use scenarios, the user will be underutilizing the carried energy and perhaps carrying too much battery or stored energy capacity.

The underutilization of carried energy may be problematic for weight sensitive devices and applications. Underutilization of energy for a device attached to a helmet, for example, may mean a significant weight penalty that a user has to tolerate on their head. In many applications it is desirable to reduce or eliminate the weight attached to a person's head area since it may cause user discomfort, fatigue, or neck problems.

One way to reduce the burden of multiple batteries and improve their utilization is to use wearable battery packs and/or central energy generators that can provide power to various peripheral devices that are attached to or carried by a person. With one or several central batteries the potable energy may be shared and distributed to the devices that need the power. However, such devices may be tethered to the person's battery pack with cables. For devices such as headlamp, microphones, night vision goggles, and the like, that are carried on a person's head or helmet, the cables may be uncomfortable, limit movement, pose a safety risk (since cables may get snagged or caught on objects and obstacles), and reduce the reliability of the system.

Thus what is needed is a better way for energy distribution for person worn peripheral devices.

SUMMARY

Wireless energy transfer can enable such peripheral devices to be powered from a wearable battery pack or portable power generator, without the safety and ergonomic drawbacks of multiple wired connections that tether the mobile electronic devices, such as a head worn device or helmet to the user.

In one aspect, a system for wireless energy transfer includes a person-worn central energy source. The energy source may be used to provide power to one or more wireless power source resonators that generate an oscillating magnetic field. The oscillating magnetic field may be used to transfer energy wirelessly to wireless power repeaters and/or devices worn by a person or carried by a person. The energy source may be a rechargeable battery. To generate electricity from the oscillating magnetic fields the system may include one or more device resonators that are configured to interact with the oscillating magnetic fields and generate an electric current. The device resonator may be helmet mounted and the source resonator may be mounted on the person's body.

In another aspect, the power output or the frequency of the person-worn source resonators may be adjusted depending on the type of tissue that is in proximity or interacts with the magnetic fields of the source resonator. The system may further include field shaping structures comprising magnetic materials and/or conducting materials, to reduce the interaction of the magnetic fields with the person's tissue and body parts.

In another aspect, a person-worn wireless energy transfer system may include a rechargeable battery and a source resonator configured to receive electrical energy from the battery and generate an oscillating magnetic field. A device resonator configured and positioned to interact with the oscillating magnetic fields may be positioned or attached to a person's helmet to transfer energy wirelessly to electronic devices mounted to the helmet or near the helmet from the rechargeable battery which may be worn near or on the torso of the person. The system may include more than one source resonator and a controller that may selectively energized each of the source resonators. The source resonators may be spaced or positioned to enable wireless energy transfer from the body of a person to the device resonator on the helmet even if the person moves, rotates, or tilts their head. The source resonators that provide the best coupling to the device resonator on the helmet may be energized depending on the rotation of the helmet. In another aspect the system may include more than one device resonator, the resonators may be positioned such that at least one resonator has good coupling to the source resonator despite any head rotations of the person wearing the helmet.

In a further aspect, the disclosure features wireless power transfer systems that include: (a) a seat configured to support a human, where the seat includes a first resonator featuring a conductive coil formed by a plurality of loops that each encircle a common first axis, a layer of magnetic material positioned adjacent the conductive coil and intersecting the first axis, and a conductive shield positioned adjacent the layer of magnetic material, where the layer of magnetic material is sandwiched between the conductive coil and the conductive shield; (b) an article of clothing for the human, the article of clothing featuring a second resonator having a conductive coil formed by a plurality of loops that each encircle a common second axis, where the second resonator is positioned in the article of clothing so that, when the article of clothing is worn by the human and the human is seated in the seat, the first and second axes are aligned; and (c) a first electronic apparatus positioned in the seat and coupled to the first resonator, and configured to deliver electrical power to the first resonator so that during operation of the system, power is transferred wirelessly from the first resonator to the second resonator.

Embodiments of the systems can include any one or more of the following features.

Each loop in the plurality of loops of the conductive coil of the first resonator can extend in a common first plane that is orthogonal to the first axis. The plurality of loops of the conductive coil of the first resonator can define a spiral in a first plane orthogonal to the first axis. The first resonator can have a dipole moment aligned along the first axis.

Each loop in the plurality of loops of the conductive coil of the second resonator can extend in a common second plane that is orthogonal to the first axis. The plurality of loops of the conductive coil of the second resonator can define a spiral in a second plane orthogonal to the first axis. The second resonator can have a dipole moment aligned along the second axis.

The plurality of loops of the conductive coil of the first resonator can define a first dipole moment oriented along a first dipole axis, the plurality of loops of the conductive coil of the second resonator can define a second dipole moment oriented along a second dipole axis, and the second resonator can be positioned in the article of clothing so that, when the article of clothing is worn by the human and the human is seated in the seat, the first and second dipole axes are parallel to within 20 degrees or less (e.g., within 15 degrees or less, within 10 degrees or less, within 5 degrees or less).

The article of clothing can be configured to be worn on a torso of the human.

The magnetic material can include a ferrite material, and the conductive shield can include a metal material. The first electronic apparatus can be configured to deliver electrical power to the first resonator in an oscillating electrical signal having a frequency of between 50 kHz and 500 kHz (e.g., between 150 kHz and 300 kHz, between 200 kHz and 300 kHz, between 240 kHz and 260 kHz, of about 250 kHz, of about 200 kHz).

The first electronic apparatus can include power and control circuitry featuring one or more switches, and the first electronic apparatus can be configured so that during operation of the system, the first electronic apparatus monitors a power transfer rate between the first and second resonators relative to a lower power transfer rate threshold and an upper power transfer rate threshold, increases a phase angle of the one or more switches if the power transfer rate is above the upper power transfer rate threshold, and decreases the phase angle if the power transfer rate is below the lower power transfer rate threshold, where the one or more switches are part of a switching amplifier in the first electronic apparatus, and where the phase angle is defined between the one or more switches in the switching amplifier.

The article of clothing can be configured to be worn on an upper torso of the human, and the article of clothing can include a battery coupled to the second resonator, a third resonator coupled to the battery, and a second electronic apparatus coupled to the second and third resonators. The system can include a helmet configured to be worn by the human and featuring a fourth resonator, the second electronic apparatus can be configured so that during operation of the system, the second electronic apparatus stores energy in the battery in response to electrical power wirelessly received by the second resonator, and the third resonator can be configured to transmit electrical power to the fourth resonator by generating an oscillating magnetic field using power from the battery. At least one of the third resonator and the fourth resonator can include a curved magnetic material and a conductive wire wrapped around the curved magnetic material. The curved magnetic material can include grooves into which the conductive wire is wound. The curved magnetic material can include two or more pieces of magnetic material.

A coil-to-coil efficiency of power transfer between the first resonator and the second resonator can be 20% or greater (e.g., 30% or greater, 40% or greater, 50% or greater). The coil-to-coil efficiency of power transfer between the first resonator and the second resonator can be 99% or less (e.g., 98% or less, 95% or less, 90% or less, 85% or less, 80% or less). A quality factors of each of the first and second resonators can be greater than 100.

During operation, the system can be configured to sustain a transfer of at least 10 W of power between the first and second resonators when the second resonator is displaced laterally in a direction orthogonal to the first axis by up to 5 cm from an initial position. During operation, the system can be configured to sustain a transfer of at least 12 W of power between the first and second resonators when the second resonator is displaced laterally in a direction orthogonal to the first axis by up to 4 cm from an initial position.

A thickness of the first resonator, measured in a direction along the first axis, can be 5 cm or less (e.g., 1 cm or less). The conductive shield can include a metallic material attached directly to a surface of the magnetic material.

Embodiments of the system can also include any of the other features and aspects disclosed herein, including features and aspects disclosed in connection with different embodiments, in any combination as appropriate.

In another aspect, the disclosure features articles of clothing that include: (a) a first resonator featuring a conductive coil formed by a plurality of loops each extending in a common first plane to define a dipole moment for the first resonator that is aligned orthogonal to the common first plane, where the first resonator is configured to wirelessly receive electrical power from an oscillating magnetic field; (b) a battery; (c) an electrical apparatus coupled to the first resonator and configured to store energy in the battery in response to the electrical power wirelessly received by the first resonator; and (d) a second resonator featuring a conductive coil coupled to the battery, where the second resonator is configured to transmit electrical power by generating an oscillating magnetic field using power from the battery.

Embodiments of the articles can include any one or more of the following features.

The second resonator can include a curved magnetic material and a conductive wire wrapped around the curved magnetic material. The curved magnetic material can include two or more pieces of magnetic material. The second resonator can be configured to transmit electrical power to a third resonator disposed in an additional article of clothing.

A coil-to-coil efficiency of power transfer between the second and third resonators can be 40% or greater (e.g., 50% or greater, 60% or greater). A quality factor of each of the second and third resonators can be greater than 100.

The third resonator can include a curved magnetic material and a conductive wire wrapped around the curved magnetic material. The second and third resonators can have a substantially similar radius of curvature.

Embodiments of the articles can also include any of the other features and aspects disclosed herein, including features and aspects disclosed in connection with different embodiments, in any combination as appropriate.

In a further aspect, the disclosure features methods of controlling wireless power transfer between a source and a receiver, the methods including monitoring a rate of wireless power transfer from the source to the receiver, increasing a phase angle of a switch of the source if the wireless power transfer rate is larger than an upper threshold value, and decreasing the phase angle if the wireless power transfer rate is smaller than a lower threshold value, where the switch is part of a switching amplifier in the source.

Embodiments of the methods can include any one or more of the following features.

The lower threshold value can be 12.5 W. The upper threshold value can be 14.5 W.

Embodiments of the methods can also include any of the other steps and features disclosed herein, including steps and features disclosed in connection with different embodiments, in any combination as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIG. 2A is a schematic diagram showing vertically aligned dipole structures.

FIG. 2B is a diagram showing horizontally aligned dipole structures.

FIG. 3 is a schematic diagram of two resonators comprising a conductor wrapped around a block of magnetic material.

FIGS. 19A-19D are schematic diagrams of embodiments of source resonators.

FIGS. 20A-20E are schematic diagrams of embodiments of device resonators.

FIG. 22A is a plot of efficiency as function of offset in the X-direction for an embodiment of a wireless energy transfer system.

FIG. 22B is a plot of efficiency as a function of offset in the Y-direction for the embodiment of the wireless energy transfer system of FIG. 22A.

FIG. 31A-31B are schematic diagrams showing coil-to-coil efficiencies with and without a model of a human body for a wireless energy transfer system.

FIGS. 32-33 are schematic diagrams showing embodiments of a curved resonator.

Like reference symbols in the various drawings indicate like elements.

DETAILED DESCRIPTION

A wireless energy transfer system may be used to wirelessly transfer energy from one or more central batteries and/or fuel cells and/or solar panels and/or other types of energy packs worn on a vest, backpack, harness, shirt, pant, belt, coat, or any type of clothing and the like, to a head worn or helmet mounted electric or electronic device. The wireless energy transfer system may use strongly-coupled magnetic resonators. The resonators may have a high quality factor Q>100. The two resonators exchanging energy by have sqrt(Q1Q2)>100. The system comprises at least one wireless energy source resonator, which might be embedded or attached to the user's equipment, clothing, vest, backpack and the like. The source resonator generates an oscillating magnetic field which may be received by one or more energy capture device resonators which may be integrated with the helmet or device. In embodiments, 5 watts or more of power may be transferred across a gap of 10 cm or 18 cm or more from a source resonator to a device resonator. In embodiments, repeaters may be used in the wireless energy transfer system.

Figure 1:
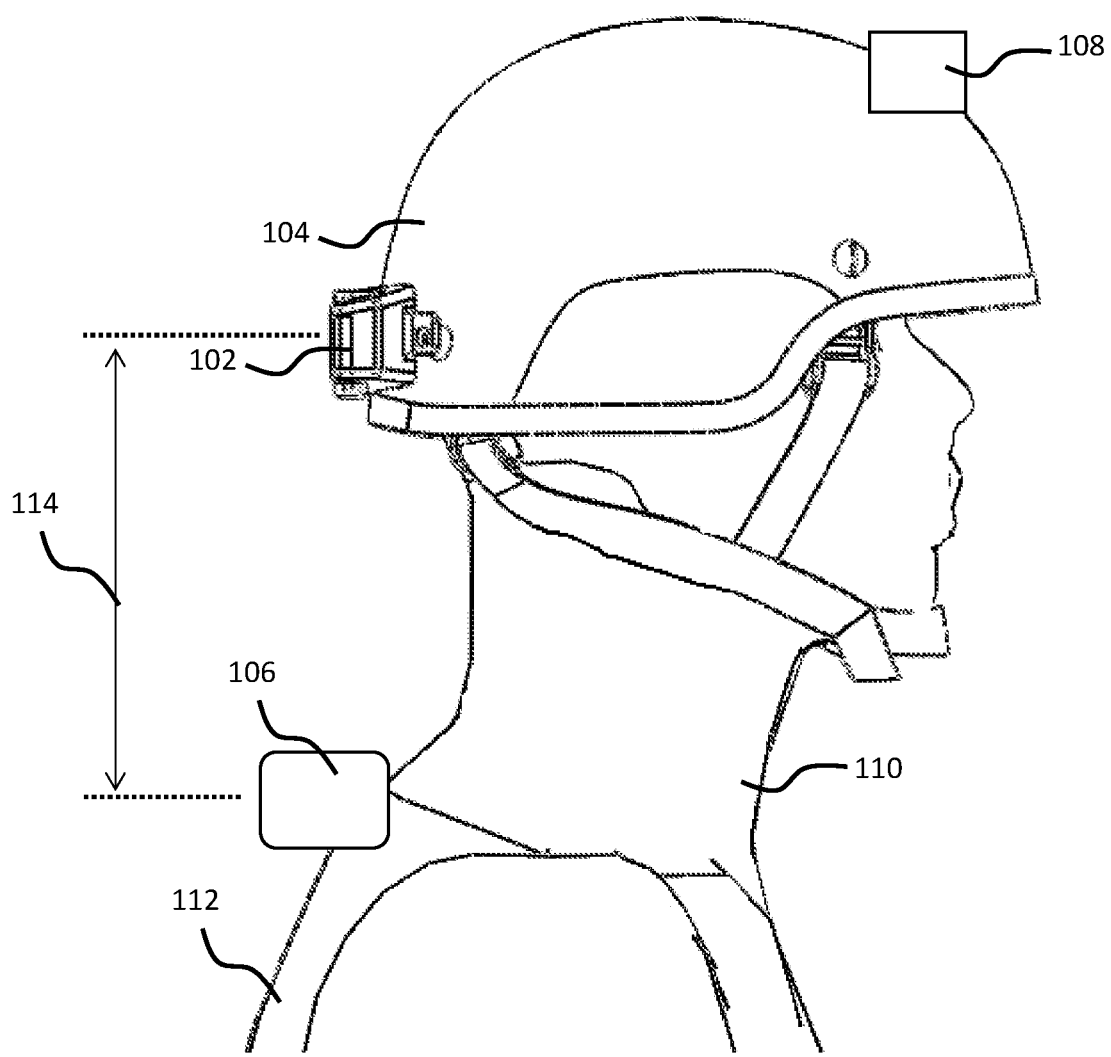
FIG. 1 is a schematic diagram of an embodiment of a system for wireless energy transfer to a helmet.

An example embodiment showing one configuration of the system is shown in FIG. 1. In the exemplary embodiment, energy is transferred wirelessly to an energy capture device resonator 102 mounted on the back of a helmet 104 from a source resonator 106 mounted on a vest 112 of a person 110. The source resonator 106 may be energized by a battery 115 carried by the person 110, which is connected to a first resonator 117. The source resonator 106 generates an oscillating magnetic field that induces an electric current in the energy capture device resonator 102. The electrical energy induced in the device resonator 102 may be used to energize electric or electronic devices 108 mounted or attached to the helmet 104. Thus energy is transferred wirelessly across a gap 114 to power devices 108 on a person's head without cables between the device and the main battery carried by the person 110.

The wireless energy transfer is based on carefully designed, high quality magnetic resonators, strongly coupled to other magnetic resonators, so that electric power is selectively and efficiently transferred from one resonator to another, via a magnetic field, with very little power lost or dissipated to other near-by off-resonant or non-resonant objects. In the system it may be necessary to ensure energy transfer during changes in resonator positioning or movement due to the movement of a person's head, changes in the mounting of the resonators and the like.

In embodiments, the system may use any number of resonators and resonator structures. A large number of suitable resonator structures have been described in U.S. patent application Ser. No. 12/789,611 Published as U.S. Publication Number 2010/0237709A1 on Sep. 23, 2010. For example, the so called planar resonator structures comprising an electrical conductor wrapped around a block of magnetic material or various configurations may be used. Likewise many different forms of capacitively loaded loop resonators with or without shielding may be employed. In embodiments, the types of resonators chosen, their orientation, size and the like may depend on the details of the application and the desired offset tolerance, size limits, power transfer efficiency, target weight specifications and the like.

In embodiments, various coil configurations with different dipole moments and orientations may be effective for person mounted (e.g. vest) to helmet energy transfer. In embodiments the resonators may be oriented with two different dipole moment orientations and configurations. FIG. 2A and FIG. 2B show two different dipole orientations of resonators, vertically aligned, and horizontally aligned. FIG. 2A shows a configuration with vertically aligned dipole moments. FIG. 2B shows a configuration with horizontally aligned dipole moments. The benefit of the parallel or horizontally aligned configuration is that both ends of the magnetic dipole resonator on the vest can couple to the helmet resonator. The parallel configuration may also have an advantage in its size, shape, and weight. In an exemplary environment, a coupling coefficient of k=0.02 was achieved with a helmet-resonator weight of 0.17 kg and a vest-resonator weight of 1.1 kg. Also, the shape of each resonator may be more suitable for integration with both the helmet and the vest than the vertical configuration.

To ensure adequate energy transfer from a source resonator on the body to a device resonator on the head and/or helmet, over a range of resonator offsets and distances with a constraint on size and weight of the resonators, the resonators may preferably be oriented with horizontally aligned dipole moments. Resonators with horizontally aligned dipole moments may be a variant of the so called planar resonator structures. An embodiment of the system with planar resonator structures is shown in FIG. 3. The helmet mounted device resonator coil (Helmet coil) and the vest mounted source resonator coil (vest coil) both comprise a conductor 304, 308 wrapped around a block or core of magnetic material 302, 306. In this configuration the two resonators have their dipole moments in the horizontal direction or parallel to one another.

An example embodiment comprising horizontally aligned resonators was used to demonstrate the feasibility and performance of the system. In the example embodiment, the energy capture device resonator mounted on the helmet comprises 10 turns of 1054/44 AWG Litz wire wound around 160 g of 3F3 ferrite material and has a Q>200. The vest-mounted resonator contains 215 g of ferrite encased in a polymer sleeve that is wound with 10 turns of the same type of Litz wire to form planar type resonators similar to that shown in FIG. 3 and has a Q>200.

A lithium ion battery back worn in the vest of the user is used as the power source for the electronics board that houses the power and control circuitry for the source resonator. The helmet-mounted resonator is connected to a small device board with a rectifier and output voltage regulator. The output regulator was set for 5 Vdc and connected to a LED headlamp for demonstration purposes.

The ferrite material used for both the helmet and vest resonators consists of small rectangular tiles that were stacked to make resonators in a parallel-piped shape. Shaped resonators may be fabricated that conform to the natural contours of both the helmet and the vest. This could be accomplished either by grinding angled faces on the individual tiles or by sintering magnetic powder in a custom mold.

Figure 4:
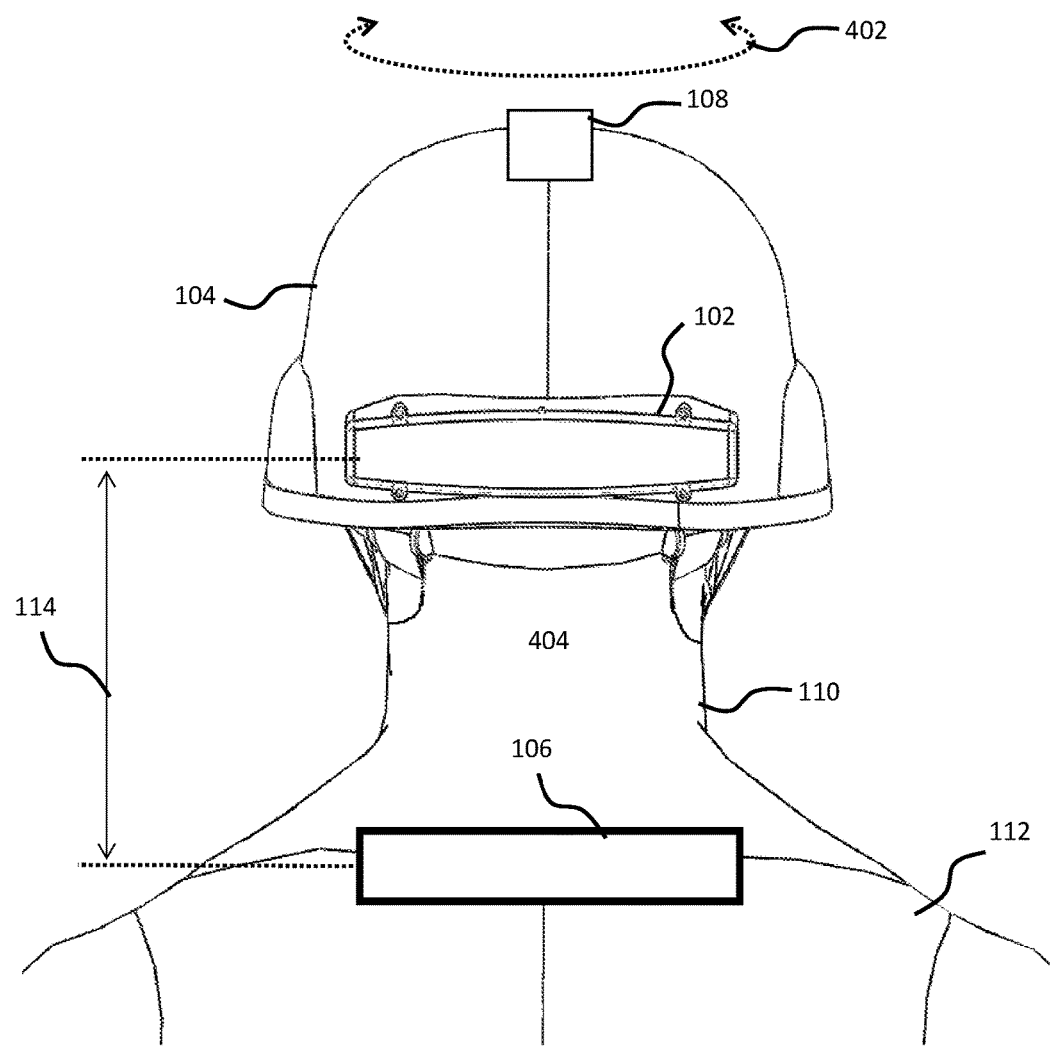
FIG. 4 is a schematic diagram of an embodiment of a system for wireless energy transfer to a helmet.

FIG. 4 shows the experimental configuration used to measure the efficiency and power as a function of head position. The source resonator 106 was mounted on the vest 112 worn by the person 110. The device or energy capture resonator 102 was mounted on the back of a helmet 104. The energy captured by the device resonator was used to power a headlamp 108 on the helmet via a wire. The separation distance 114 as well as the azimuth angle or the head rotation angle 402 was modified while parameters of the wireless energy transfer were measured.

Figure 5:
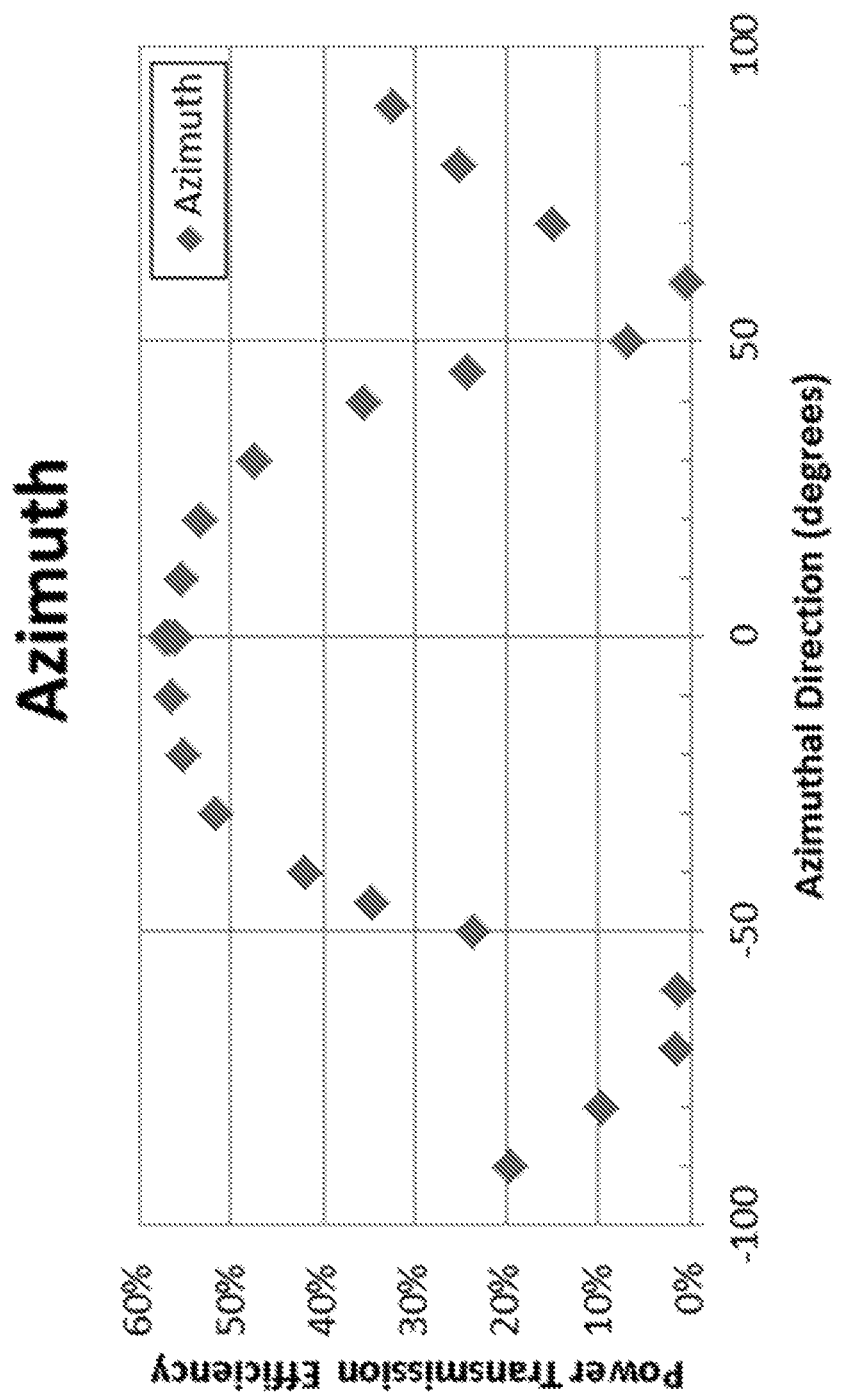
FIG. 5 is a graph showing energy transfer efficiency as a function of azimuth angle for a helmet wireless energy transfer system.

The efficiency of energy transfer as a function of the azimuth rotation for 12 cm separation distance between the source and device resonators is shown in FIG. 5. When the resonators are aligned the efficiency of energy transfer reaches almost 60%. A null in the coupling coefficient occurs when the head swivels approximately 60 degrees in azimuth and is manifested as a drop in efficiency of energy transfer in the figure. The null may be extended or moved to larger angles by enlarging the resonators along their dipole moments.

Figure 6:
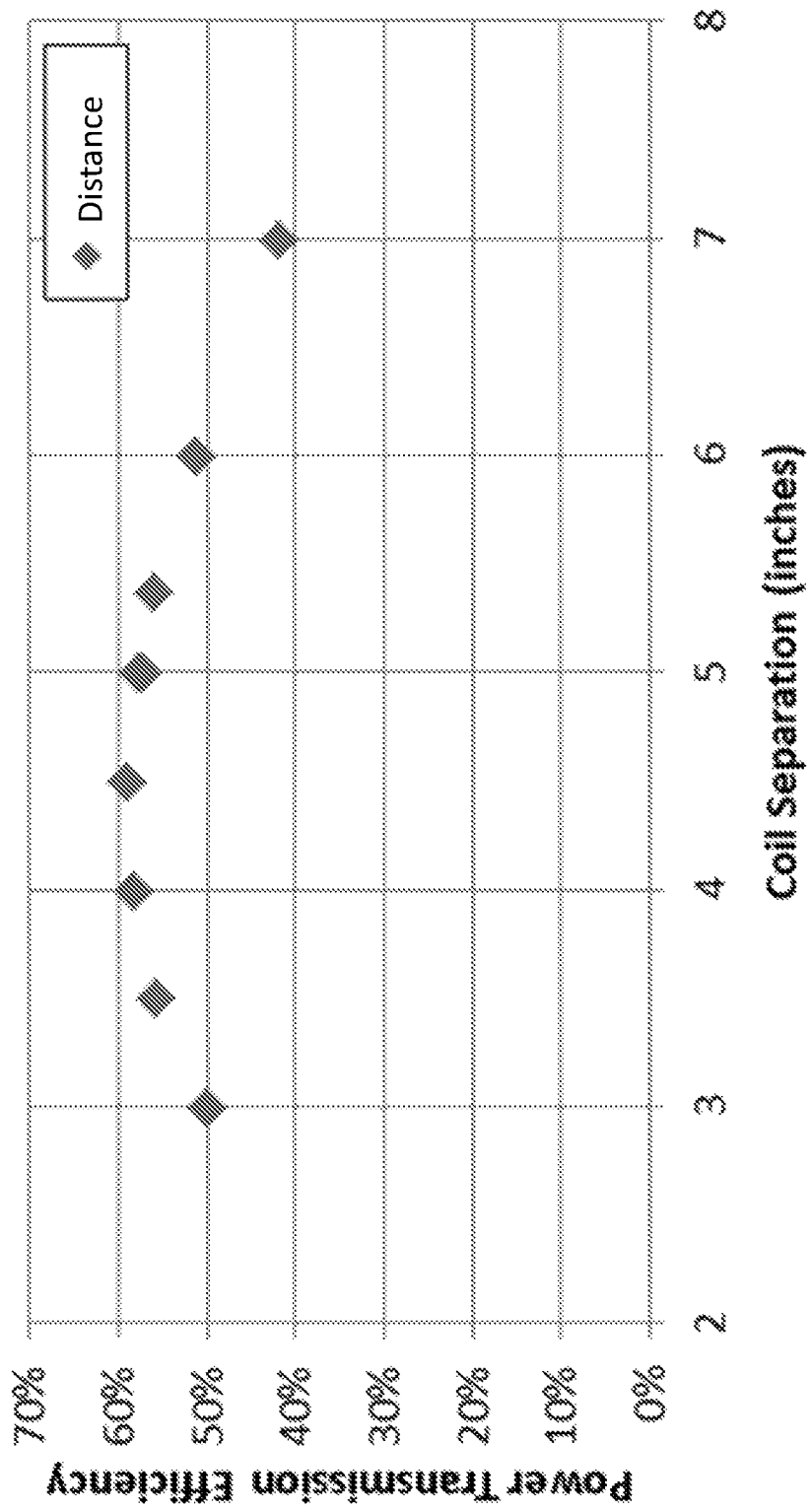
FIG. 6 is a graph showing energy transfer efficiency as a function of coil separation for a helmet wireless energy transfer system.

The efficiency of energy transfer as a function of the separation distance between the source and device resonators is shown in FIG. 6. The graph shows that even though the resonators were tuned for a fixed distance of 12 cm the efficiency of energy transfer remain above 50% for the variation of separation distance of 7.5 cm to 15 cm.

In embodiments, the captured energy may be used to power any number of devices, sensors, electronics, communication equipment and the like on or around the head or on the helmet. The electrical energy from the device resonator may be used directly as AC current or may be conditioned or rectified to provide DC current. In embodiments the system may include a small energy storage element on the helmet or on the head that is charged from the energy captured by the device resonator. The energy storage may be a rechargeable battery or a super capacitor that may be used to provide energy to the devices in cases when the wireless energy transfer gets interrupted. For example if the user rotates his head to reach the null point in the resonator coupling the wireless energy transfer may be interrupted. During this time power delivery to the electronics may be continued by using energy in the small battery or super capacitor. The energy storage element may be sized according to the expected or maximum time of wireless energy interruption for a specific use scenario. For example, use studies may be conducted to examine the frequency and amount of time that a user may turn his head to an area where the wireless energy transfer is no longer effective. The energy storage element may be sized only to provide energy to the devices during those times and recharge when wireless energy transfer is again possible. The energy storage element may therefore be small or light weight compared to a battery that is expected to power the devices continuously.

In other embodiments, the source resonators and the device resonators may be configured to reduce or eliminate dead spots within the range of the person's head mobility. In one exemplary embodiment, multiple source resonators may be used as wireless energy sources. The multiple source resonators may be selectively driven depending on the rotation of the head. The source resonator with the strongest coupling may only be activated or some or all of the source resonators may be driven with oscillating currents with different phase or amplitude to steer the magnetic fields.

Figure 7:
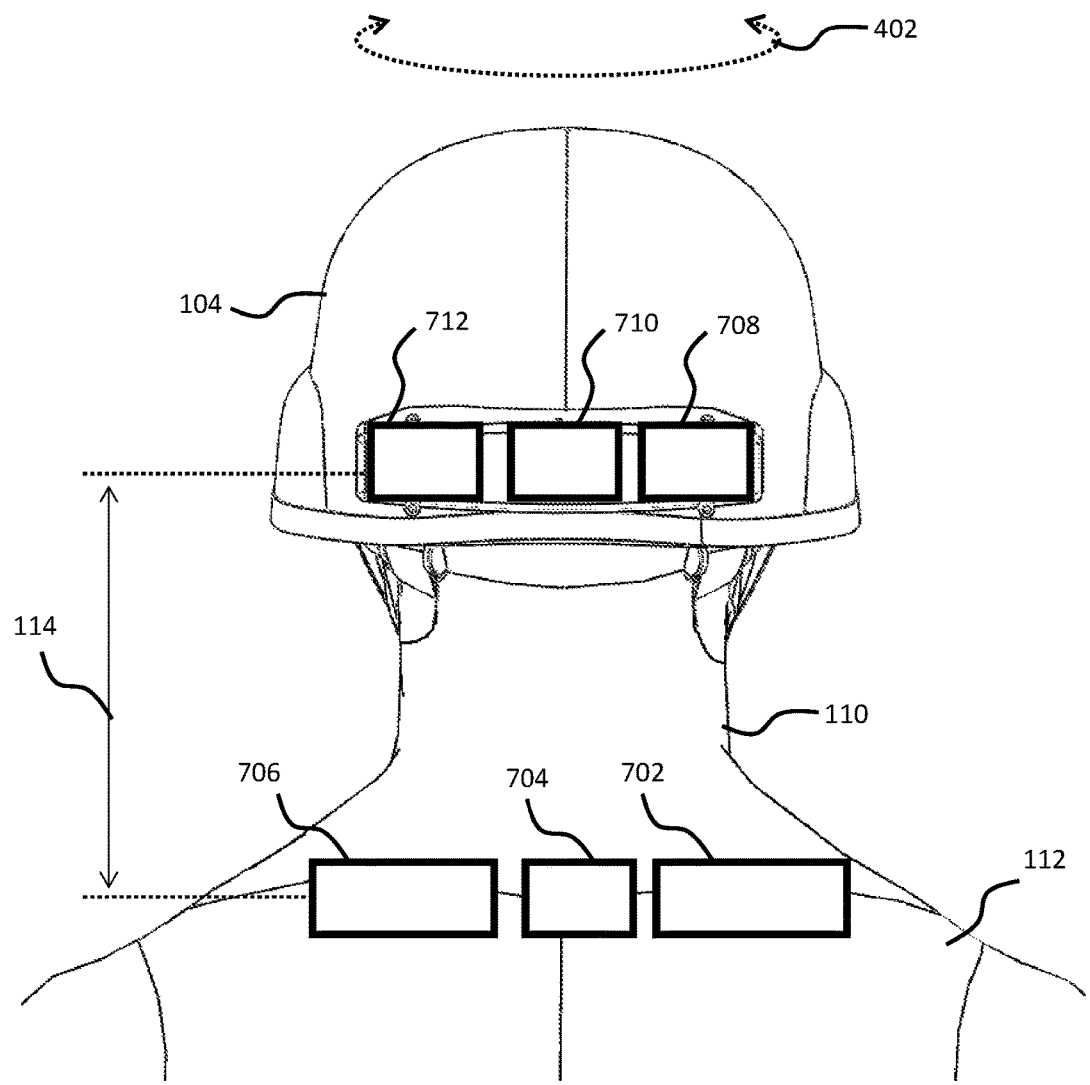
FIG. 7 is a schematic diagram of an embodiment of a system for wireless energy transfer to a helmet using multiple source and device resonators.

In one exemplary embodiment, multiple device resonators 712, 710, 708 may be used to capture the energy from one or more source resonators 706, 704, 702 as depicted in FIG. 7. The multiple device resonators may be selectively activated depending on the rotation 402 of the head. Only the device resonator with the strongest coupling to the source may be activated or all three or more device resonators may be activated and their captured electrical energy combined to charge a battery or power an electronic device. The system may include a controller to measure the efficiency of energy transfer and electrical characteristics of the energy transfer between the sources and devices. By measuring the voltage and current on the source resonators and voltage and current on the device resonators the controller may actively choose to energize some or all of the sources depending on the measurements.

In embodiments, the device or source resonator may be used to charge batteries from an external wireless energy source. The source resonator worn by the person may normally be used to transfer energy to the helmet but may be configurable to also capture energy from an external source allowing the resonator to wirelessly recharge the central person worn battery. The source resonator worn by the person may be configured to become a device resonator. The electronics may be configurable from a source amplifier functionality to rectifier and battery charger functionality. External source resonators may be mounted inside vehicles, on the back of seats, beds, and other structures providing wireless energy to the resonator mounted on the person when the person is sitting in the vehicle, resting in a bed, and the like.

In embodiments source resonators may be located on the shoulders, back, front, neck, chest, stomach, hips, buttocks, thighs, hands, feet, and arms of the person. Device resonators capable of capturing the energy may be positioned on the sides, back, top and the like of the helmet, head, and head-worn devices. The device resonators may be positioned on the outside of the helmet or may be configured to cover the inside of the helmet protecting it from external abrasions and damage.

Figure 8:
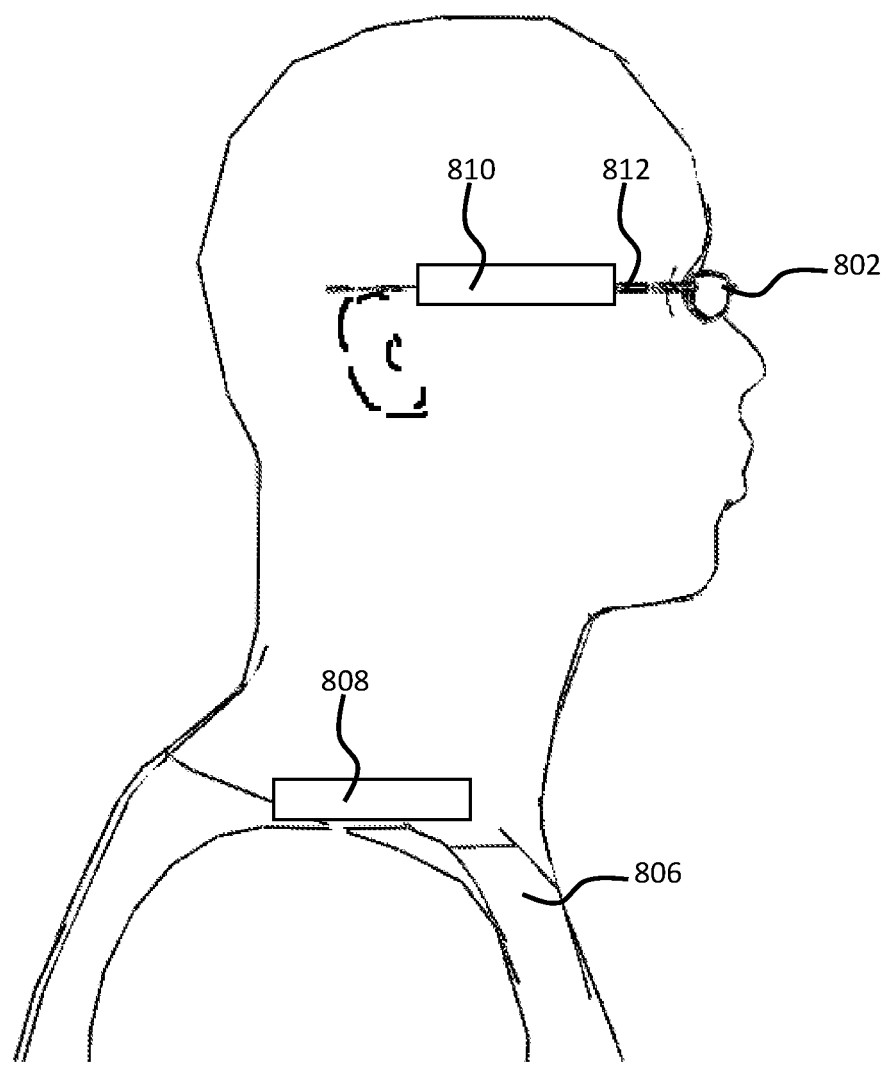
FIG. 8 is a schematic diagram of an embodiment of a system for wireless energy transfer to glasses using a shoulder mounted source resonator.

Although the example embodiment demonstrated the use of a wireless energy transfer system from a vest to a helmet, it should be understood that other configurations are within the scope of this design. Energy may be transferred from a person to any number of peripherals that may be carried, or attached to a person. For example energy may be transferred to glasses, heads up displays, portable monitors and the like. An example embodiment for wireless energy transfer to a glasses mounted heads up display is shown in FIG. 8. The heads up display may have a device resonator 810 mounted on the side or the temple area 812 of the glasses 802. The source resonator 808 may be worn on the shoulder area of the person. The source resonator 808 may be energized from a person worn battery that may be carried on the back or side of the person eliminating a heavy battery or energy storage element from the glasses.

In other embodiments energy may be transferred from a vest to a device carried by the user such as a weapon, computer, tool, and the like. Energy may be transferred from the legs to shoes that may be integrated with sensors for monitoring the persons' foot health, or overall fitness and stability by measuring stride length, pressure, movement and the like.

Likewise, although the exemplary embodiment was described using a military helmet those skilled in the art will appreciate that the design may be configured for any helmet or any head mounted structure for recreational, industrial, and other uses. For example, wireless energy transfer may be used for motorcycle helmets to power radios, lights, and instruments inside the helmet. In another example wireless energy transfer may be used in bicycle helmets to transfer energy from a backpack to a helmet fitted with lights. In another example, wireless energy transfer may be used for hard hats to power lights, radios, sensors, glasses and the like.

In embodiments, wireless energy transfer for person worn peripherals, a system may include a separate device resonator for each electronic device. Having an independent resonator for each device may allow simpler power control. Each device may be able to control its resonator and detune the resonator from the resonant frequency of the source if it is off or not requiring power. In some embodiments, the device resonators may be imbedded in the devices requiring power. In other embodiments, a single source resonator may power many device resonators.

In other embodiments, the device resonators may be separate from the devices. The device resonator may be located separately from the device requiring power. The energy captured by the device resonator may be transferred to the device via conductor wire. A separate wired device resonator may be placed away from the device in a location closer to a source resonator or in a location that is less obtrusive to the user. For example, in the helmet embodiment shown in FIG. 1, the device resonator 102 is located at a distance away from the headlamp 108 and energy is transferred to the headlamp from the device resonator via a wire (not shown). In this embodiment the device resonator was positioned to reduce inconvenience and obstruction to the user.

In some embodiments, a single device resonator may deliver power to more than one electronic device. In embodiments energy transfer may be divided into regions or subsystems. For example, wireless energy transfer may be used to span moving human parts or areas where wires are cumbersome or ineffective and once transferred wirelessly may be distributed in a traditional means using electrical conductors such as wires, printed circuit board (PCB) traces, conductive textiles, and the like. For example, a helmet may be such a subsystem. A single device resonator may wirelessly receive energy and distribute the energy to multiple devices on the helmet or near the helmet using wires. Other such systems may include hands, shoes, feet, arms, and the like. In embodiments a subsystem may include more than one device resonator that may receive wireless energy from more than one source resonator and distribute the energy over one or more devices in the subsystem.

In embodiments, the device resonators may be embedded in the batteries or the battery packs of the devices. The batteries of devices may be configured for wireless energy transfer allowing the batteries to be recharged when within range of a wireless energy source. For example, sample designs of wireless power enabled batteries are described in U.S. patent application Ser. No. 13/534,966 published on Jan. 2, 2014 as U.S. 2014/0002012 and entitled "Wireless Energy Transfer for Rechargeable Batteries," the contents of which are incorporated by reference.

In embodiments, the person worn energy transfer system may include safety precautions. The oscillating magnetic fields may cause localized tissue heating or induced currents in some types of tissues. Depending on the location and orientation of the resonators it may be important to limit the power output of the source resonators or the magnitude of the magnetic fields reaching the body tissue or the nervous system of the user. In the example system shown in FIG. 4, five watts was safely transferred to the device resonators while meeting all safety limits despite being close to the spinal cord and nervous system tissue of the user. To meet safety limits it may be preferable to operate the resonators at resonant frequencies at higher frequencies of 150 kHz or more. In some embodiments resonant frequencies and the frequencies of the generated magnetic fields may be 1 MHz or more.

In embodiments, the system may include shielding material around high power (10 W or more) source of device resonators to limit or reduce the interactions of the magnetic fields used for energy transfer with the person's body parts. The shielding may comprise a good electrical conductor. The electrical conductor shield may be positioned against a portion of the user's body such that the magnetic fields of the source are deflected away from that portion of the user's body. In embodiments the shield may comprise a flexible electrical conductor. The conductor may be a thin sheet of copper or an electrically conductive textile for example.

Going back to the example embodiment of wireless energy transfer to a helmet as shown in FIG. 4, the system may include a shield to reduce the interactions of the fields with the back of the neck, spice, and head. In embodiments that may require higher power transfer, 10 W or 20 W or more the system may include a flexible or rigid flap that covers the neck area 404 of the user. The flap may comprise a conductive material that shields the neck and spinal cord from the magnetic fields. The flap map be part of the helmet or part of the headwear of the user. In embodiments, the shield may be part of the collar of the user's clothing.

FIG. 9 shows an embodiment of a wireless power transfer system for a soldier's outerwear or gear, including helmet 904 and vest 908, where a resonator 902, 906 may be shaped to be more conformal to the human body and/or gear. In exemplary embodiments, each resonator may be curved to better conform to the gear of the soldier. In exemplary embodiments, each resonator may be curved to increase efficiency of wireless power transfer from vest to helmet. In embodiments, the source resonator and device resonator may have substantially the same degree and/or radius of curvatures. For example, the degree of curvatures of the resonators may be within ±5 degrees, ±10 degrees, or more relative to one another. In another example, the radii of curvatures of the resonators may be within 5 mm, 10 mm, or more of one another.

Figure 10:
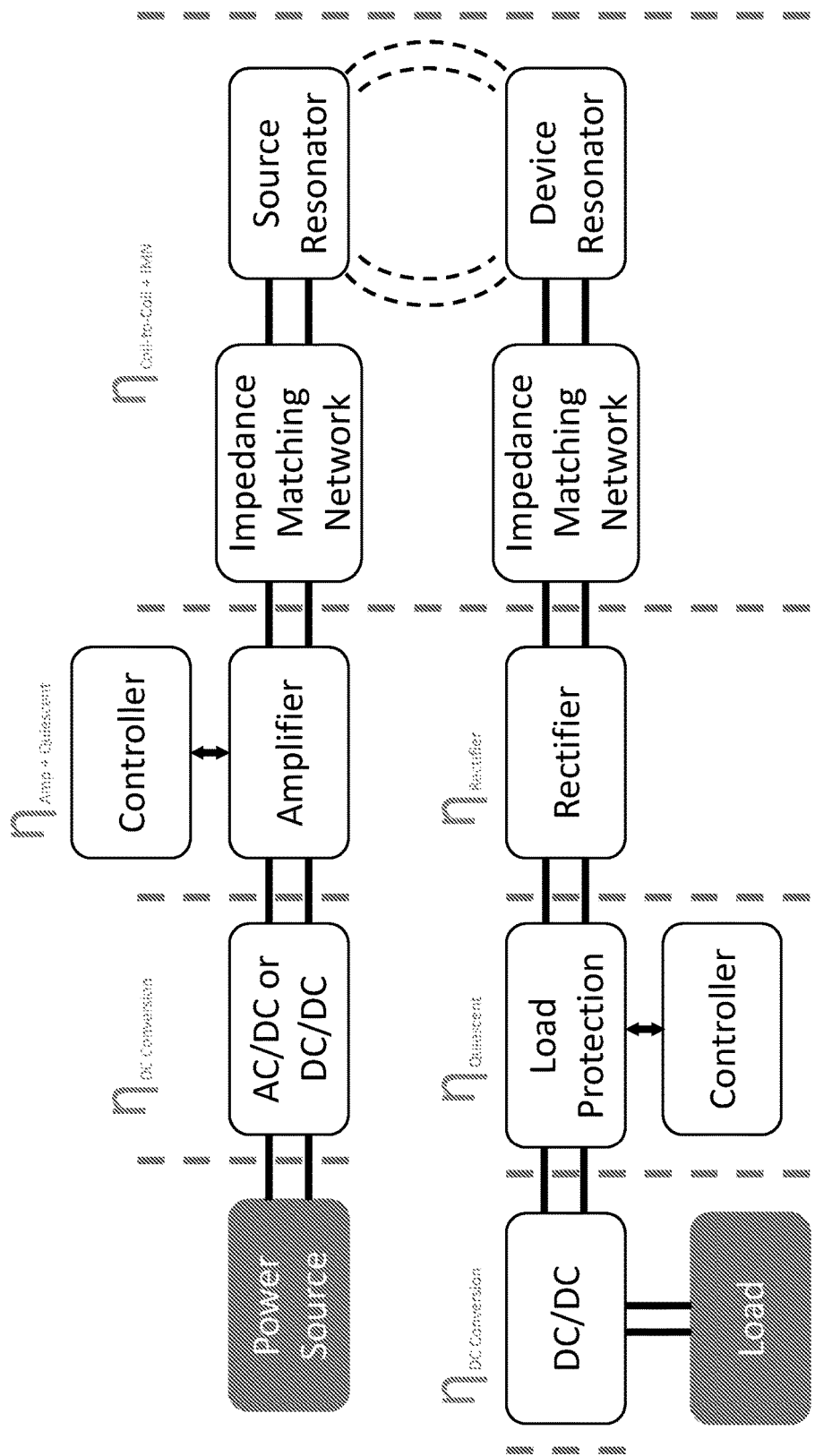
FIG. 10 is a schematic diagram of an embodiment of a wireless power transfer system.

FIG. 10 shows a high-level view of a wireless power transfer system from the power source to the load. In this embodiment, the wireless power transfer system may comprise an AC/DC and/or DC/DC converter, amplifier, source-side impedance matching network, source resonator, device resonator, device-side impedance matching network, rectifier, load protector, DC/DC converter, and the like. In some embodiments, the wireless power transfer system may comprise one or more controllers along the path. In further embodiments, the wireless power transfer system may comprise a communication facility to support system performance monitoring and control.

Figure 11A:
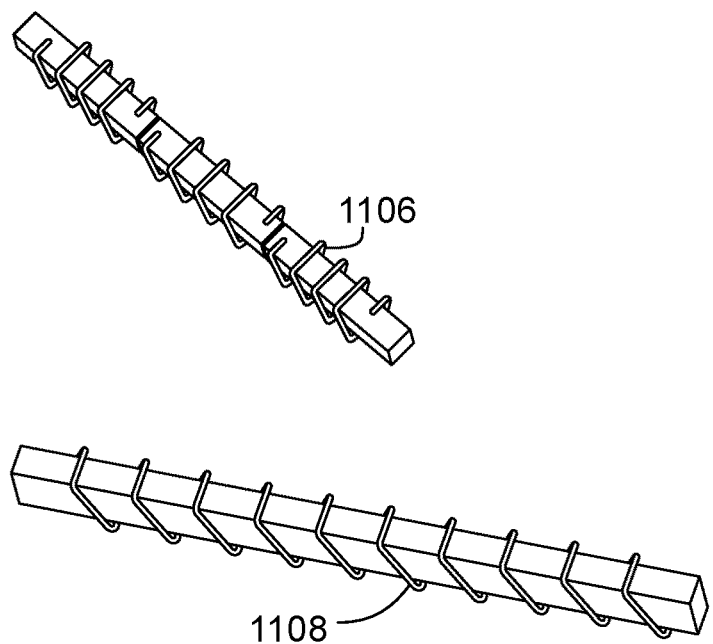
FIGS. 11A-11B are schematic diagrams of embodiments of a wireless power transfer system.
Figure 11B:
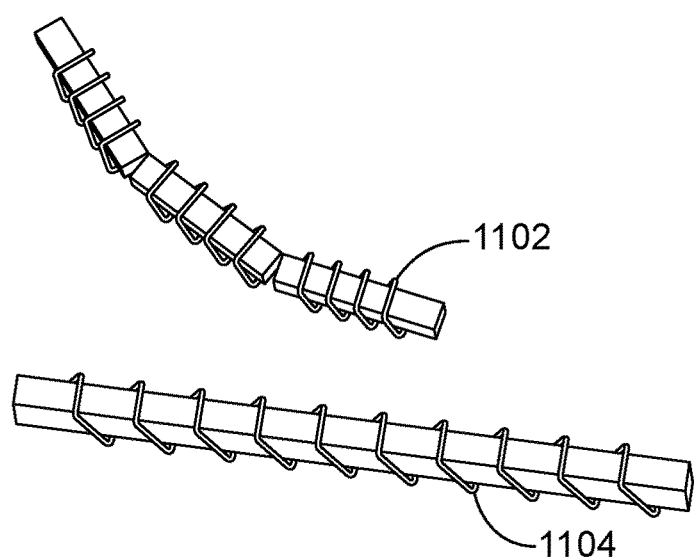
Figure 12A:
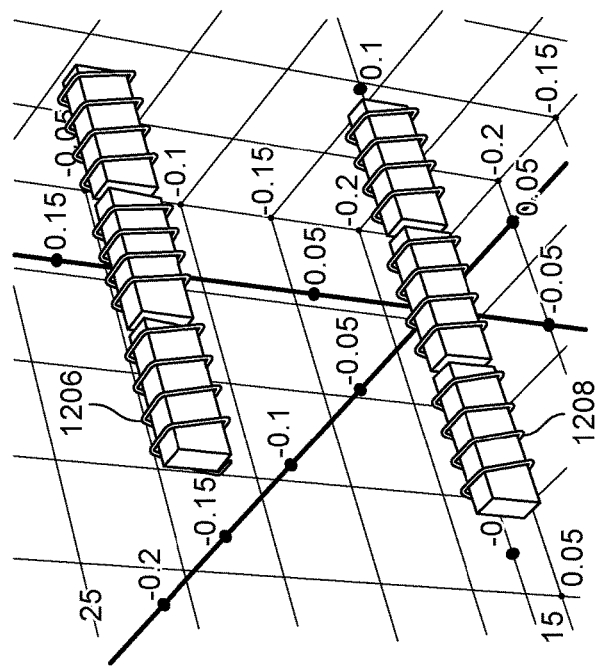
FIGS. 12A-12B are schematic diagrams of embodiments of a wireless power transfer system.
Figure 12B:
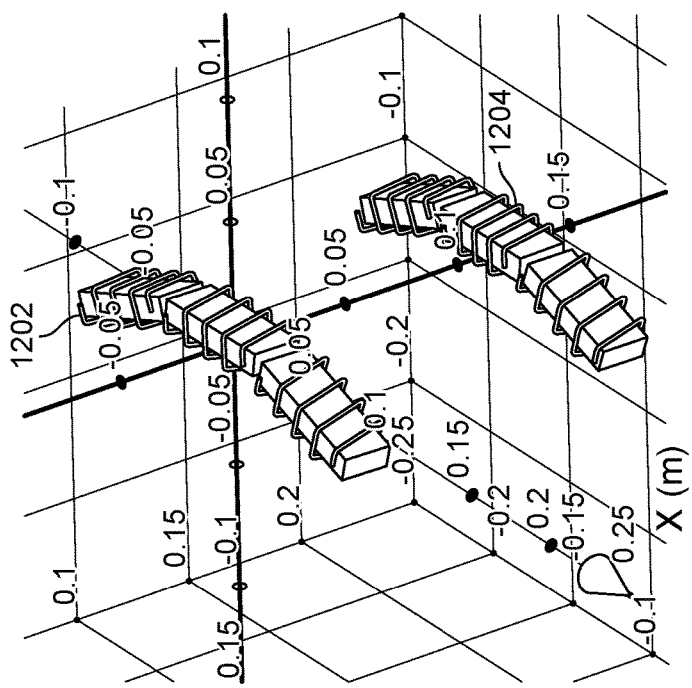

FIG. 11A shows an embodiment of a wireless power transfer system comprising two resonators, both having substantially straight shapes 1106, 1108. FIG. 11B shows an embodiment of a wireless power transfer system comprising two resonators, one having a curved shape 1102 and one having a straight shape 1104. In some embodiments, the coupling between the resonators in FIG. 11B may be worse compared to the coupling between resonators in FIG. 11A due to the mismatch of shapes within a resonator set. For example, in the example embodiment shown in FIG. 11, coupling k for FIG. 11A is 0.0182 while the k value for FIG. 11B is 0.0162. This may be remedied by designing both resonators of the system to be of similar shape, as seen in FIG. 12B. In this embodiment, the coupling between the curved resonators 1202, 1204 in FIG. 12B matches that of the straight resonators 1206, 1208 in FIG. 12A, when other parameters and conditions are kept equal.

Figure 13A:
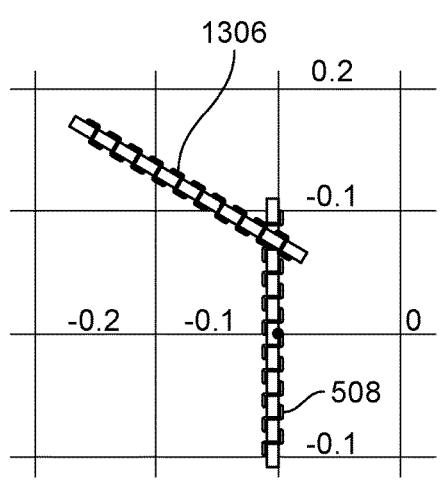
FIGS. 13A-13B are schematic diagrams of embodiments of a wireless power transfer system.
Figure 13B:
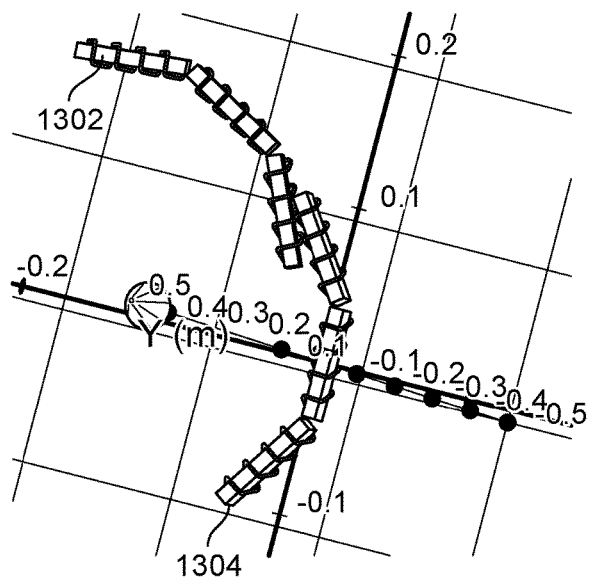

FIG. 13A shows an embodiment of a wireless power transfer system comprising two straight-shaped resonators 1306, 1308 moving with respect to one another. Similarly, FIG. 13B shows an embodiment of a wireless power transfer system comprising two curve-shaped resonators 1302, 1304 moving with respect to one another.

Figure 9A:
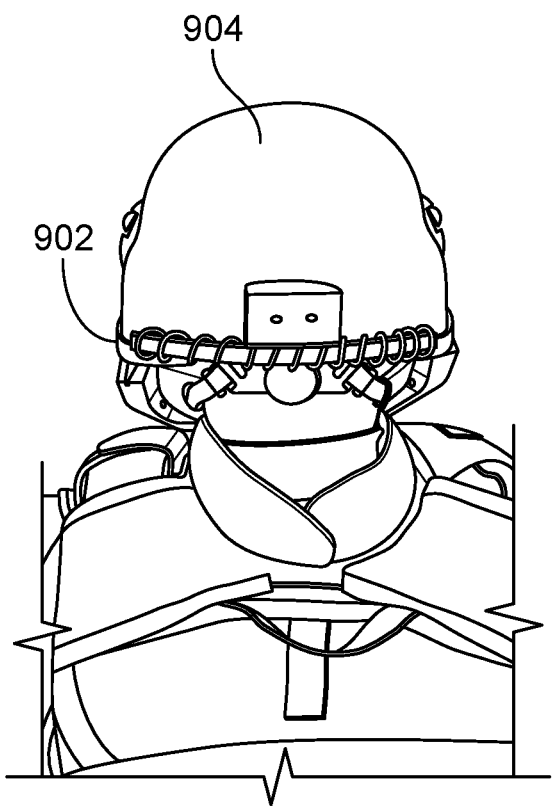
FIGS. 9A-9B are images showing embodiments of a wireless power transfer system for a soldier.
Figure 9B:
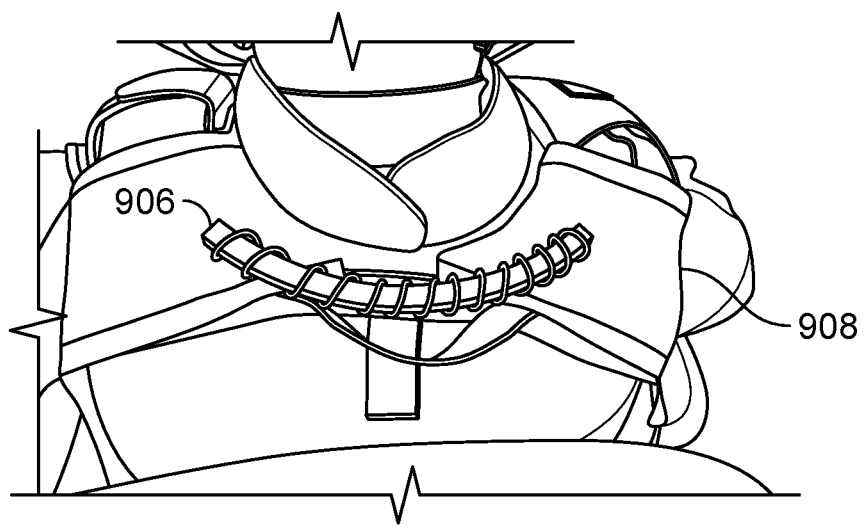
Figure 13C:
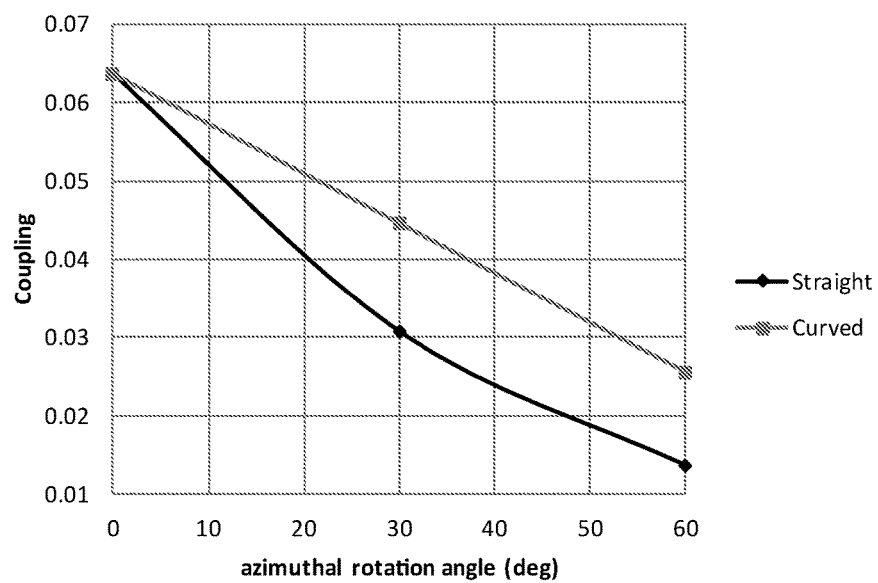
FIG. 13C shows a plot of coupling as a function of azimuthal rotation angle in degrees for each of the embodiments shown in FIG. 13A and FIG. 13B.

FIG. 13C shows a comparison of the movement of straight-shaped and curve-shaped resonators and the effects on coupling values. The data shows that as there is greater degree of movement (in azimuthal rotation angle), there is an associated decrease in coupling for both sets of straight-shaped and curve-shaped resonators. However, it can also be seen from the data that coupling between the curved-shaped resonators is typically greater than or equal to that of the straight-shaped resonators. Therefore, in some embodiments, such as when an application may require lateral or rotational movement of resonators with respect to one another, curve-shaped resonators may be advantageous. In the example of a soldier wearing a wireless power transfer system integrated in his or her gear as shown in FIG. 9A and FIG. 9B, greater coupling between a source and device resonator while maintaining a greater degree of movement may be important in efficiently delivering power to critical tools, weapons, and the like.

In some embodiments, a wireless power resonator may comprise more than one piece of magnetic material. It may be advantageous to use multiple pieces (e.g., 3 or more) of magnetic material in a resonator due to weight, cost, size, shape or positional restrictions. For example, in fitting a curve, multiple pieces of magnetic material may be necessary when it is not possible to create or form the magnetic material to a particular shape. In exemplary embodiments, lengths of magnetic material segments may be greater than 1 cm, greater than 3 cm, greater than 5 cm, and the like.

Figure 14A:
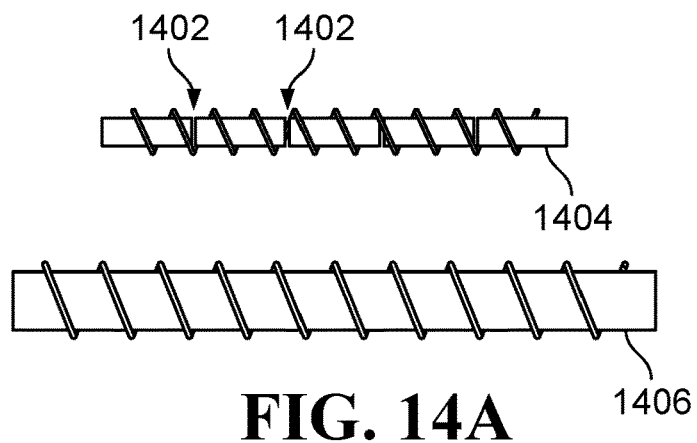
FIG. 14A is a schematic diagram of an embodiment of a wireless power transfer system.
Figure 14B:
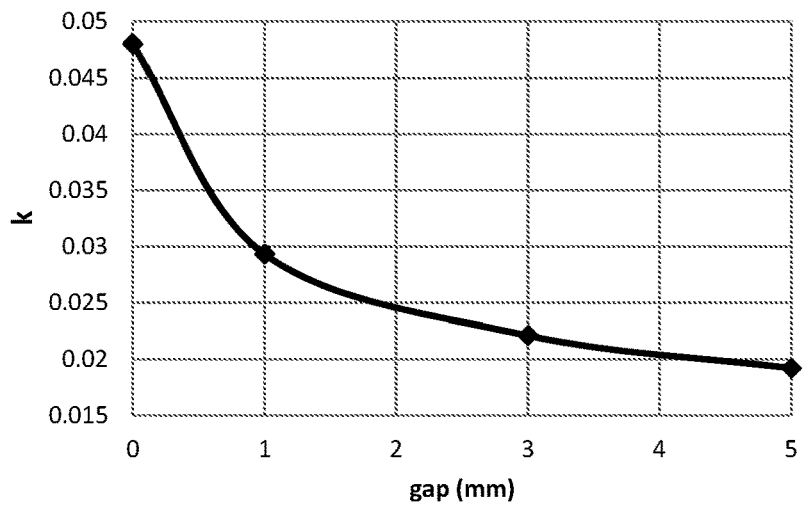
FIG. 14B is a plot showing coupling as a function of gap between the wireless power source and device of FIG. 14A.

In a preferred embodiment, a wireless power resonator may comprise multiple pieces of magnetic material in which the pieces are joined so there is little space in between the pieces. In preferable embodiments, the spaces between the segments of magnetic material may be less than 0.5 mm, less than 1 mm, less than 5 mm, and the like. In addition, ends of magnets may be beveled to further reduce the spaces between the segments of magnetic material. Less space between magnetic material may lead to greater coupling and efficiency. FIG. 14A shows an example of a source resonator 1406 and a device resonator 1404 where gaps 1402 have been formed at intervals in the magnetic material in the device resonator 1404. FIG. 14B shows how coupling, k, decreases with increasing gap size between the pieces of magnetic material.

In embodiments, a wireless power resonator comprising a curved shaped magnetic material may be lighter in weight than the straight piece of magnetic material that may be required to achieve similar coupling efficiencies. Similarly, in embodiments, a resonator comprising multiple pieces of magnetic material to create a curve shape may also be lighter due to the gaps in between segments. For example, such a resonator may be greater than 10% lighter, greater than 25% lighter, greater than 50% lighter than a straight-shaped resonator.

Figure 15A:
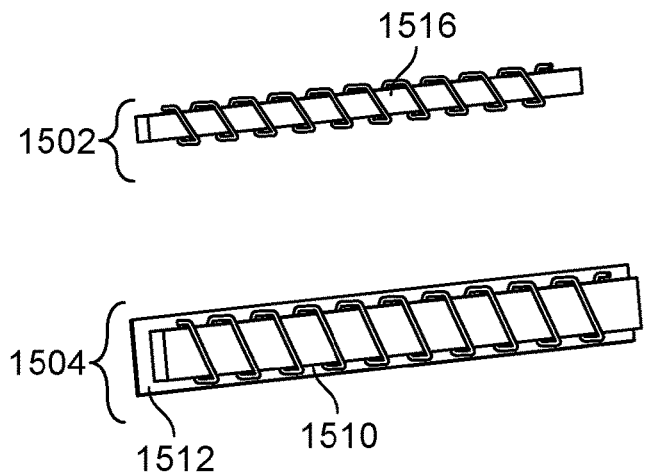
FIGS. 15A-15B are schematic diagrams of embodiments of a wireless power transfer system.

In another exemplary embodiment, a wireless energy transfer system may comprise different types of resonators. For example, FIG. 15A shows a pair of resonators 1502, 1504 where the source resonator coil 1510 may be shielded using additional magnetic material or conductive material 1512. This shield may be used to guide or otherwise control the magnetic field.

Figure 15B:
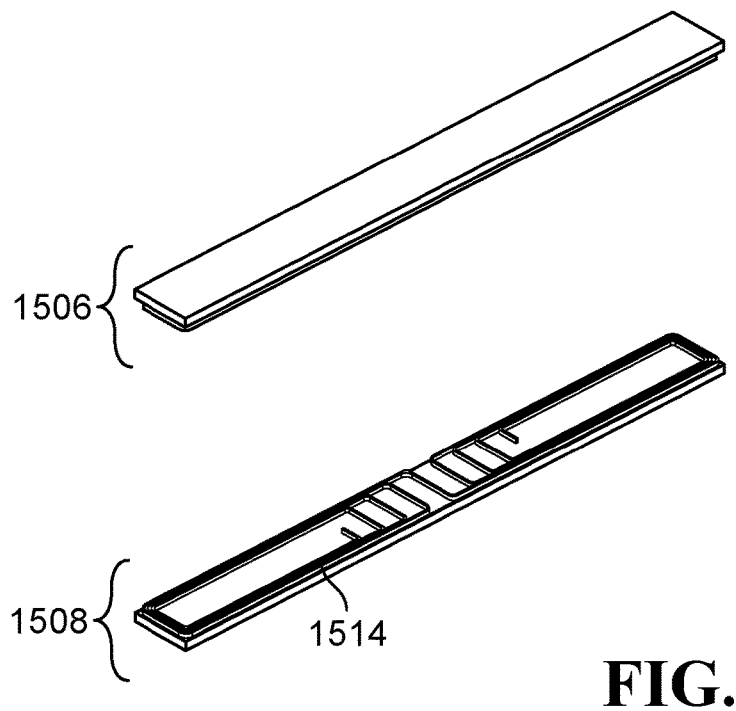

FIG. 15B shows yet another embodiment of a pair of resonators 1506, 1508 where the source and device resonators comprise a different coil shape. This resonator coil 1514 may be on one side of the magnetic material and may have a lower profile and weight compared to the coil shape 1516 shown in FIG. 15A. Such a resonator coil may be designed such that its span varies along its length, as shown in FIG. 15A.

Any of the features described may be used alone or in combination without departing from the scope of this disclosure. A resonator may be referred to as a source resonator or a device resonator and may be designed to be interchangeable. Each shown resonator may comprise one or more conducting loops and/or one or more pieces of magnetic material, as well as capacitors, inductors, resistors, other electronics and the like.

Seat to Vest Power Transmission

Several different types of resonators were modeled and analyzed to predict the energy transfer performance and to ensure the design meets Federal Communications Commission (FCC) and International Commission on Non-Ionizing Radiation Protection (ICNIRP) limits for human safety. In exemplary embodiments, the system design was chosen to allow for a wide range of positional flexibility and high efficiency. In further embodiments, the system design was chosen to not increase the weight on the soldier. In yet further embodiment, the system design was chosen to decrease the weight on the soldier. In exemplary embodiments, more than 10 W of power was transmitted wirelessly from a wireless power source in the seat back 1602 to a wireless power device in a vest 1604 over a wide range of movement and positioning at an operating frequency of 250 kHz (see FIG. 16A). Using the coordinate convention seen in FIG. 16B, the range over which more than 10 W of power was transmitted is: ±5 cm in the X-direction, ±5 cm in the Y-direction, and 5 cm in the Z-direction. In exemplary embodiments, more than 12 W of power was transmitted wirelessly from a seat to a vest at an operating frequency of 250 kHz. This amount of power was transmitted over the following range: ±4 cm in the X-direction, ±4 cm in the Y-direction, and 5 cm in the Z-direction.

As shown in FIG. 16, the target application consists of a soldier-worn vest-mounted device and a source resonator designed to be incorporated in a vehicle seat. An electromagnetic study was performed to ensure the viability of the system design. As part of this effort, the modeling and simulation results were evaluated with respect to compliance with applicable human exposure limits for Specific Absorption Rates (SARs), as delineated by ICNIRP, Institute of Electrical and Electronics Engineers (IEEE), and or FCC. While the initial study focused on a 10 W system, the simulations have been performed to determine the practical upper limit of power transfer that could be implemented while complying with applicable FCC human exposure limits.

Conformal Seat Resonator Constraints

In exemplary embodiments, mechanical constraints may be defined for the seatback source and vest device resonators based on the dimensions of the selected seat and the soldier vest. The following are constraints that help determine the parameters for the simulation models. In exemplary embodiments, the source resonator area is within the area of a cushion of the seat. In embodiments, the thickness of the source resonator is within the thickness of a seat cushion, such as less than 5 cm, less than 3 cm, less than 1 cm, or less. In embodiments, the source resonator may be shielded using magnetic material to avoid any lossy materials in the construction of a seat. The shielding may be between the resonator and the seat back, the shielding may be around the resonator, and/or the shielding may cover one or more lossy parts of a seat.

In exemplary embodiments, the device resonator area may be within a width and length of a soldier's clothing, vest, or jacket. In embodiments, the device resonator is within 20 cm by 20 cm, 15 cm by 15 cm, 10 cm by 10 cm, or smaller. In embodiments, the device resonator thickness is less than 3 cm, less than 2 cm, less than 1 cm, or thinner. In embodiments, the weight of the device is minimized to be less than the 20 lbs, less than 10 lbs, less than 5 lbs, or less. In embodiments, movement in the lateral (X-direction) is at least ±2 cm, ±5 cm, or more. In embodiments, movement in the vertical (Y-direction) is at least ±2 cm, ±5 cm, or more. In embodiments, movement in the separation (Z-direction) is at least ±2 cm, ±5 cm, ±7 cm, or more.

Magnetic Performance

In order to optimize magnetic performance for a given wireless system, priority or design bounds may be placed on the system. Some of the design trades which were considered include but are not limited to the following: human safety, coil-to-coil efficiency, coil-to-coil distance separation, coil-to-coil offset, weight, size, shape, and movement.

Figure 17:
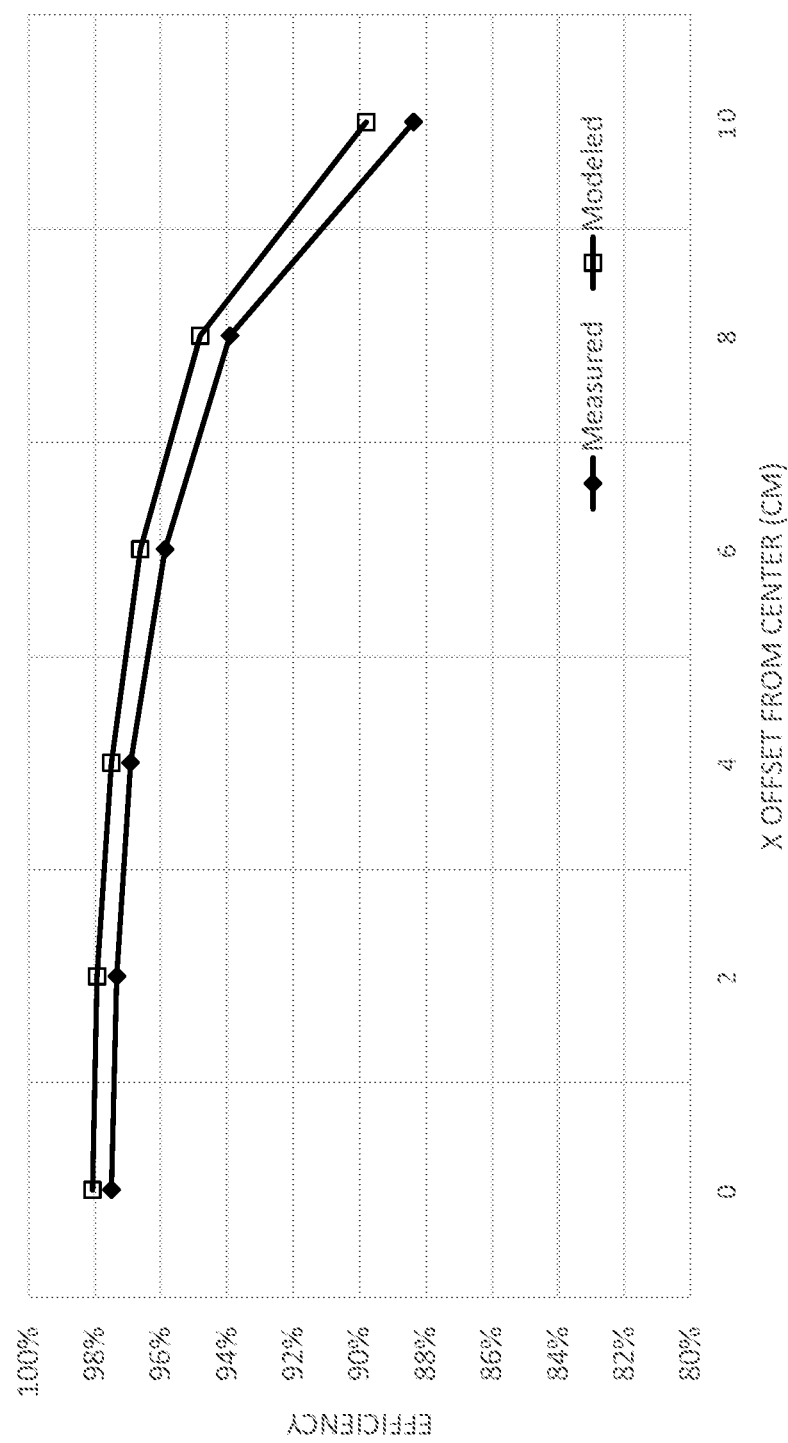
FIG. 17 is a plot showing coil-to-coil efficiency as a function of offset in the X-direction for an embodiment of a wireless power transfer system.

In FIG. 17, the result of the modeled and measured coil-to-coil efficiencies for Z=5 cm are shown. The measured data correlates with the modeled data within the expected tolerances. Coil-to-coil efficiencies were computed using the following measured and/or modeled coupling k and quality factor Q values: k: 3%-19%, $Q_s$: 335, $Q_d$: 508.

Figures 18A, 18B:
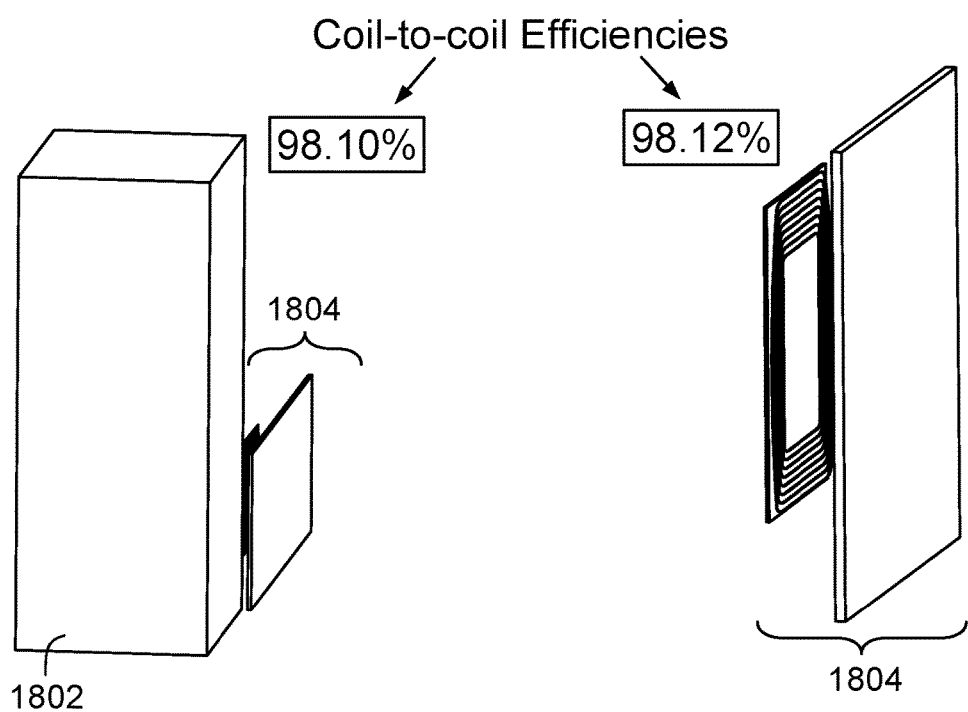
FIGS. 18A-18B are schematic diagrams showing coil-to-coil efficiencies with and without a model of a human body in an embodiment of a wireless power transfer system.

In exemplary embodiments, because the wireless energy system may be positioned near the human body, it may be necessary to determine the impact of the body on the coil-to-coil performance. FIG. 18 demonstrates that when considering various design trades, the effect of the human body for these types of resonators is small and can be neglected. System 1804 includes a first resonator 1817 that receives energy from a seat-mounted resonator 1819 (FIG. 18B). First resonator 1817 includes a plurality of planar conductive loops positioned in a plane 1803, and defining a dipole moment 1805 that is orthogonal to plane 1803. The block 1802 shown in FIG. 18A is a model for the human body, specifically muscle tissue. The decrease in coil-to-coil efficiency is small (from 98.12% to 98.10%) compared to the system 1804 without a human body model present (FIG. 18B). This approximation may be useful in speeding up the simulation process to draw general conclusions about design trades. In embodiments, during the design trade optimization process, the following assumptions may be made. In embodiments, metallic or lossy objects may be positioned away from the proximity of the source and device resonators. In embodiments, the operating frequency may range between 250 kHz-6.78 MHz. In embodiments, the operating frequency may be greater than 6.78 MHz. In embodiments, the power delivered to the load may be greater than 5 W, greater than 10 W, or more. In embodiments, the distance between the resonator in soldier's vest and a soldier's body is greater than 1 cm, greater than 2 cm, or more. In embodiments, the distance between the source and device resonators may be greater than 2 cm, greater than 4 cm, greater than 6 cm, or more. In the interest of targeting a lighter and potentially smaller resonator coil for the device resonator coil (on the vest), performance was evaluated as a function of the area of the device resonator coil.

Source Resonator Embodiments

In exemplary embodiments, various resonator coil types were investigated for both the seatback and vest sides to achieve efficient options for a wireless power transfer system. The resonator coil types shown in FIG. 19 have been modeled with the system considerations discussed above in order to evaluate coil-to-coil efficiencies, X and Y offset performances as well as human safety limits.

For the source resonator coils, the types considered include a metal-backed magnetic material (such as ferrite) shield in order to prevent efficiency degradation due to close proximity with any lossy materials, such as the aluminum framework inside the seat cushion. FIG. 19 shows embodiments of the resonator coil types that were considered:

FIG. 19A: Type B: Planar resonator coil 1902 made of solid or Litz wire with magnetic material 1904 and a metal shield 1906;

FIG. 19B: Type D: Solenoidal resonator coil 1908 made of solid or Litz wire with magnetic material 1910 and a metal shield 1912;

FIG. 19C: PCB: Resonator coil with PCB trace 1914 with magnetic material 1916 and a metal shield 1918;

FIG. 19D: Type E: Planar resonator coil with double winding 1920 and a magnetic material 1922 and a metal shield 1924.

Device Resonator Embodiments

FIG. 20 shows exemplary embodiments of device resonator coils considered. In exemplary embodiments of the device resonator, shields may not be considered there are no metallic or lossy objects present in the close proximity of the resonator coil. In embodiments, shields may be used to decreases losses in the case where there are metallic or lossy objects present. By not requiring a shield, the weight of the device may be reduced significantly and also make the device resonator coil more flexible in shape and placement into gear. The following embodiments were considered for a device resonator:

FIG. 20A: Type A: Planar resonator coil 2002 made of solid wire or Litz wire without magnetic material or a metal shield;

FIG. 20B: Type B: Planar resonator coil 2004 made of solid wire or Litz wire with magnetic material 2006;

FIG. 20C: Type C: Solenoidal resonator coil 2010 made of solid wire or Litz wire with magnetic material 2008;

FIG. 20D: PCB: Resonator coil 2012 with PCB trace;

FIG. 20E: Type E: Planar resonator coil 2014 made of solid wire or Litz wire with double winding with magnetic material 2016.

Among these coils, the Type A, Type B, and PCB resonator coils have magnetic dipole moments substantially orthogonal to the plane in which the resonator coil is mounted whereas the magnetic dipole moments for Type C, Type D, and Type E resonator coils are substantially parallel with the plane. For optimal overall performance, source and device resonator coil magnetic dipole moments may need to align.

In exemplary embodiments, the following combinations were studied for this application:

TABLE 1

Source and device resonator coil combinations.

| Source | Device |
| --- | --- |
| Type B | Type B (no shield) |
| Type B | Type A |
| Type D | Type C |
| PCB (with ferrite and shield) | PCB (no ferrite, no shield) |
| Type E | Type E |

For all of these combinations, efficiency degradation was analyzed as a function of misalignment and maximum power that can be delivered to the load before reaching FCC and ICNIRP SAR and E-field limits. In an exemplary embodiment, based on the results of the magnetic study, a Type B resonator coil with dimensions of 20×16 cm was chosen for the seatback and a Type A resonator coil with dimensions of 16×16 cm was chosen for the vest-worn resonator coil. The operating frequency was chosen to be 250 kHz. Based on the chosen frequency, resonator coil type, geometry, and proximity to the soldier, it was determined that up to approximately 37.6 W could be transferred before reaching the limit in the ICNIRP guidelines.

Figure 16A:
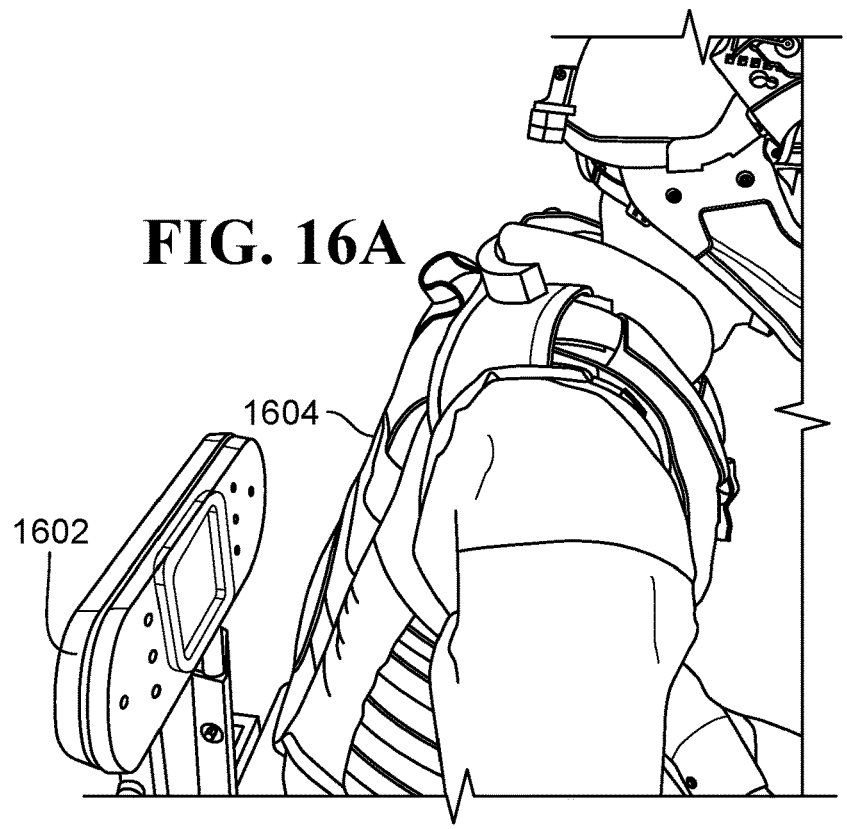
FIG. 16A is an image of an embodiment of wireless power transfer in a seat-vest-helmet system.
Figure 16B:
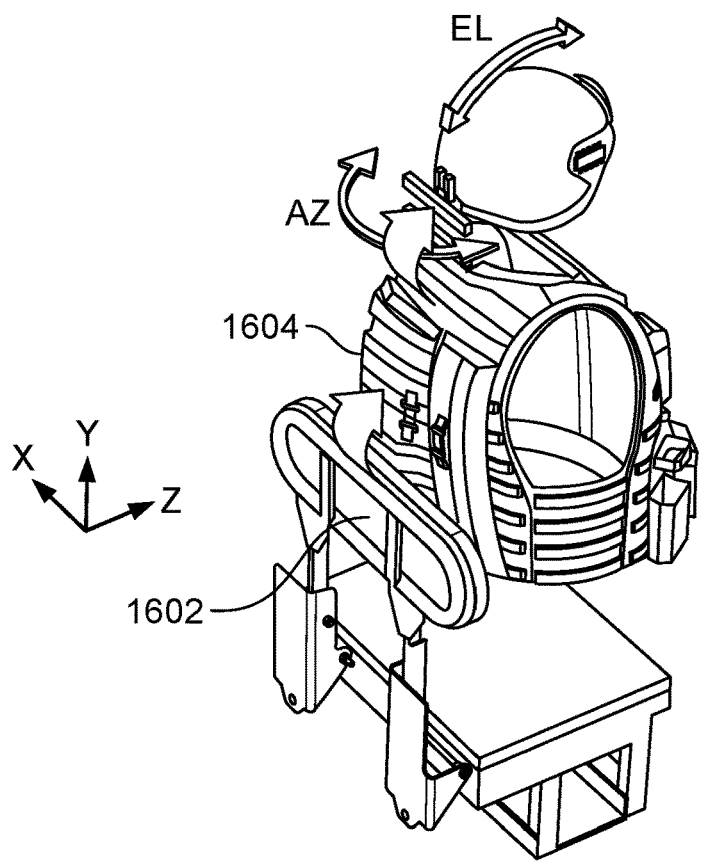
FIG. 16B is an image of an embodiment of wireless power transfer in a seat-vest-helmet system.

Highly Resonant Wireless Power Transfer (HRWPT) Seat-Vest System and Performance FIG. 16 shows an exemplary embodiment of a highly resonant wireless transfer system including a seat-back source 1602 and a vest-worn device 1604. FIG. 16B shows an embodiment of a model of a system further including the vest-worn source and a helmet-mounted device in addition to the system shown in FIG. 16A. A typical high level block diagram for a HRWPT system is shown in FIG. 10. Each stage of the system has a power efficiency rating caused by losses in the stage. The Greek symbol η represents the efficiency of a given stage. Because quiescent currents do not change drastically as output power is increased, the quiescent efficiency ($\eta_{quiescent}$) will actually increase with power. For example, assuming there is a constant quiescent power draw of around 1 W, the quiescent efficiency for a 10 W power delivery would be about 91% whereas if the power delivery were 20 W, the quiescent efficiency would be about 95%. Note, however, that the quiescent power is required for both source and device electronics. The overall efficiency is calculated by multiplying the efficiency of each stage. Considering the same circumstance above where 1 W each is consumed by the source and device electronics, the total quiescent efficiency would be 83% for a 10 W power delivery and 91% for a 20 W delivery. This results in an 8% difference.

Figure 21:
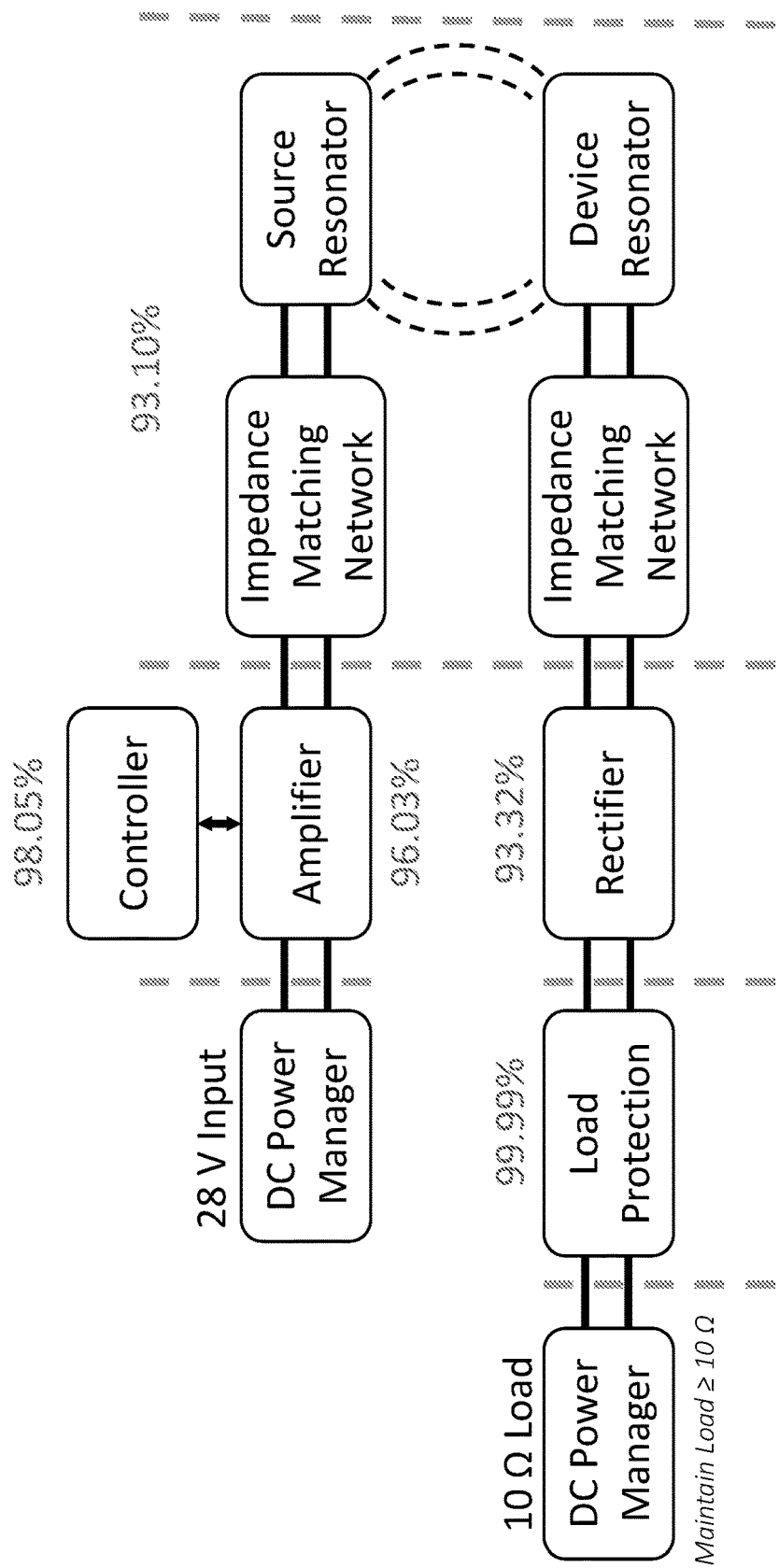
FIG. 21 is a schematic diagram of an embodiment of a wireless energy transfer system.

Due to the multiplicative nature of the stages' efficiencies, it is advantageous to minimize quiescent losses and/or eliminate as many stages as possible. FIG. 21 shows the high level block diagram for a HRWPT seat-vest system with the unnecessary stages removed and a breakdown of efficiencies based on measurements of electronic losses and overall end-to-end efficiency. In this embodiment, the output power is 12.6 W at a Z-distance of 5 cm and X=Y=0 cm. An end-to-end efficiency of 82% was found for the system and is a product of all the individual efficiencies of each block. Efficiencies are shown at a single operating point and will vary across operation. Efficiencies are approximated using measurements and end-to-end system efficiency calculations.

Figure 23A:
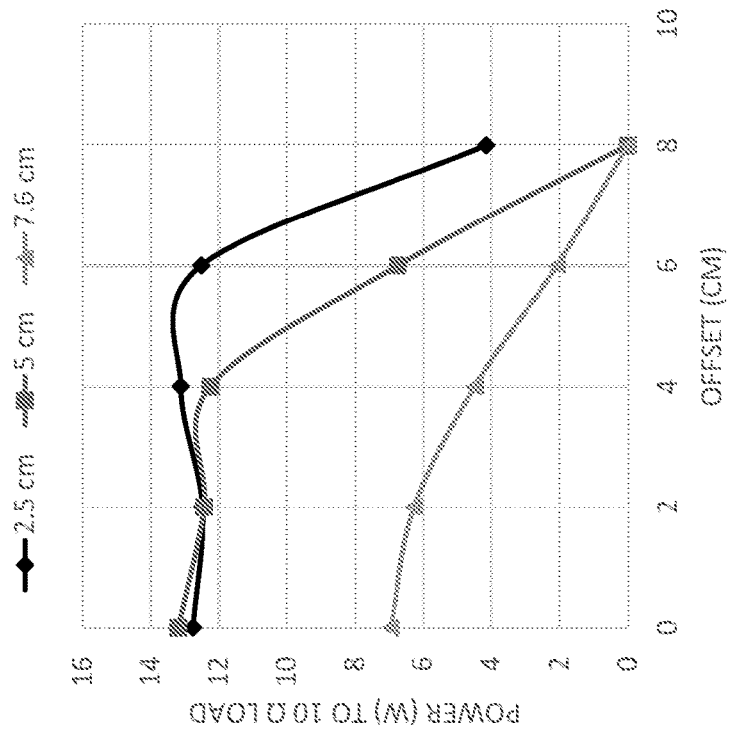
FIG. 23A is a plot of power to a load as function of offset in the X-direction for an embodiment of a wireless energy transfer system.
Figure 23B:
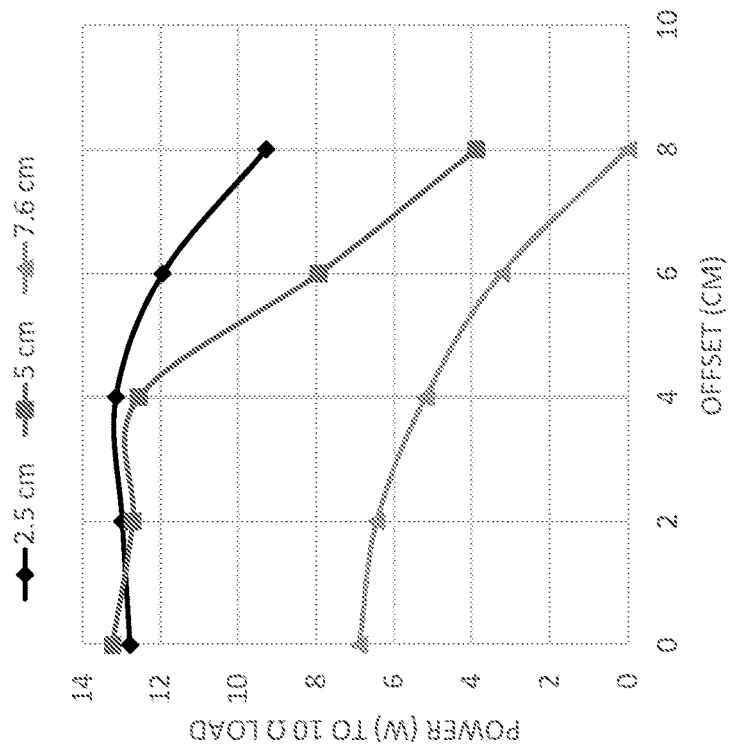
FIG. 23B is a plot of power to a load as function of offset in the Y-direction for the embodiment of the wireless energy transfer system of FIG. 23A.

FIG. 22 shows plots of end-to-end efficiency and FIG. 23 shows plots of DC output power. FIG. 22 shows an approximate 80% end-to-end efficiency at ±5 cm X (FIG. 22A) and Y (FIG. 22B) offset with 5 cm of separation between resonators. FIG. 23 shows an approximate output power of 12 W at ±4 cm X (FIG. 23A) and Y (FIG. 23B) offset with 5 cm of separation between resonator coils. Note that the use of a source power algorithm flattens peak power output, allows increased range of operation, and improves efficiency. In exemplary embodiments, the algorithm includes the monitoring of source power to ensure it is within a window of, for example, 12.5 W (lower threshold) to 14.5 W (upper threshold). In embodiments, the monitoring of the source power can be done by measuring the current and/or voltage into the input of the amplifier of the source. If source power is above the upper threshold, the phase angle of the switches of the switching amplifier of the power and control circuitry may be increased. In exemplary embodiments, the switching amplifier may be a differential class D amplifier. In other embodiments, the switching amplifier may of another class of amplifier, such as class E. This in turn may decrease power to below the upper threshold. If the source power is below the lower threshold, the phase angle of the switches of the power and control circuitry may be decreased. This in turn may increase power to above the lower threshold. Other thresholds may be set for the source power. In embodiments, other elements of the power and control circuitry may be adjusted to regulate source power.

Figure 24:
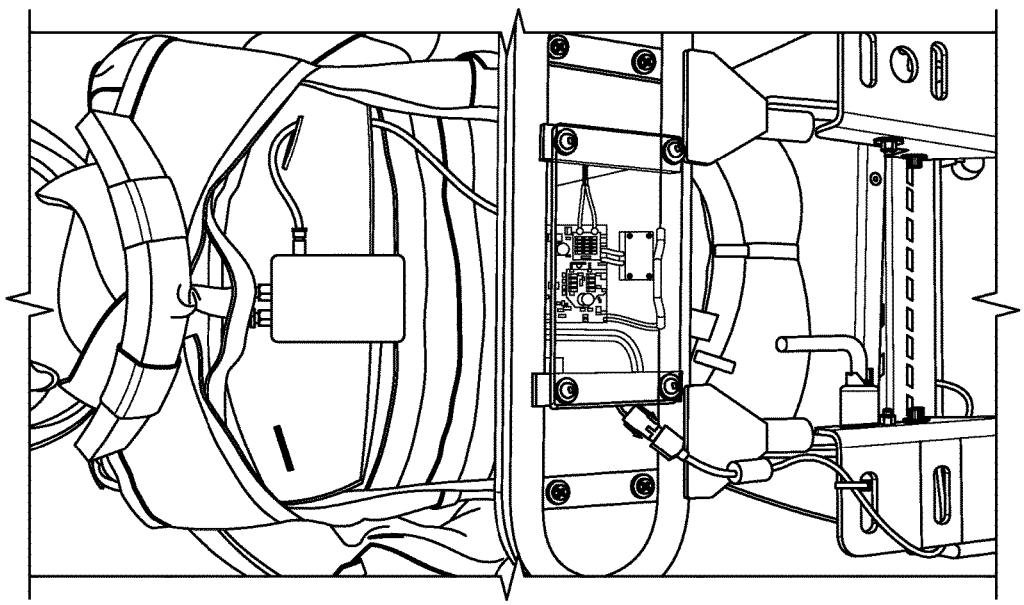
FIGS. 24-25 are images showing an embodiment of a wireless energy transfer system in a seat and a vest.
Figure 25:
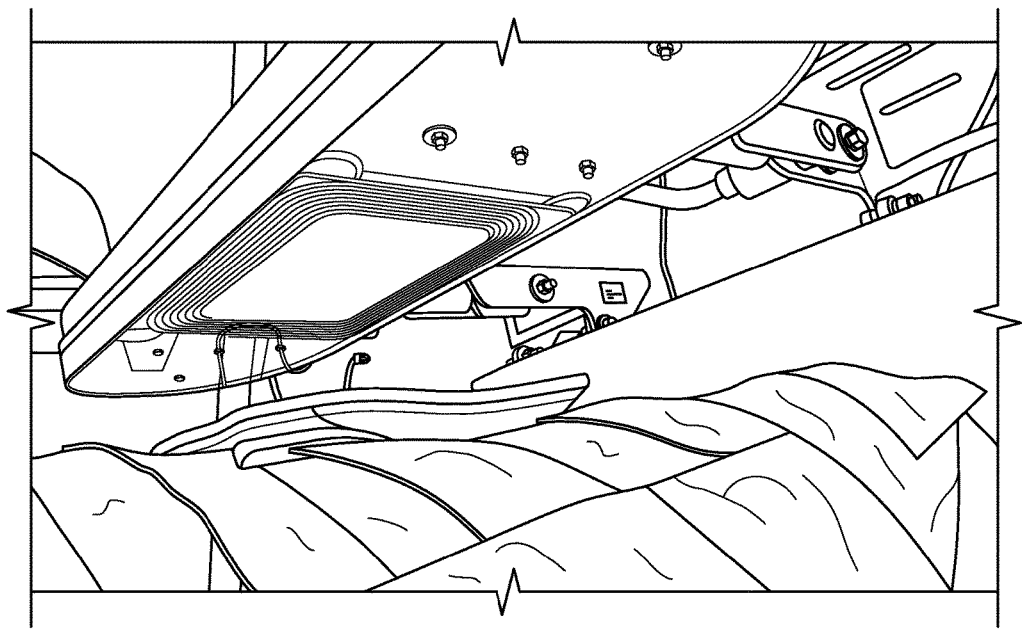

Note also that for the designed HRWPT seatback system, a DC output load resistance of 10.5 Ω was chosen. Embodiments of the HRWPT seatback system with electronics are shown in FIGS. 24-25.

Modeling and simulation tools were utilized to explore and optimize the wireless efficiency and performance of the HRWPT seatback system for the specified range of operation. The modeling and simulation tools were also used to evaluate compliance with applicable human exposure limits for Specific Absorption Rates (SARs) and internal E-field level, as delineated by ICNIRP, IEEE, and/or FCC. The end-result was a highly efficient 250 kHz system capable of 12 W over a lateral and vertical movement of 0±4 cm (8 cm total) and a separation distance of up to 5 cm. An additional 2 cm of movement can be obtained yielding a minimum of 10 W output.

Vest to Helmet Power Transmission

Figures 26A, 26B:
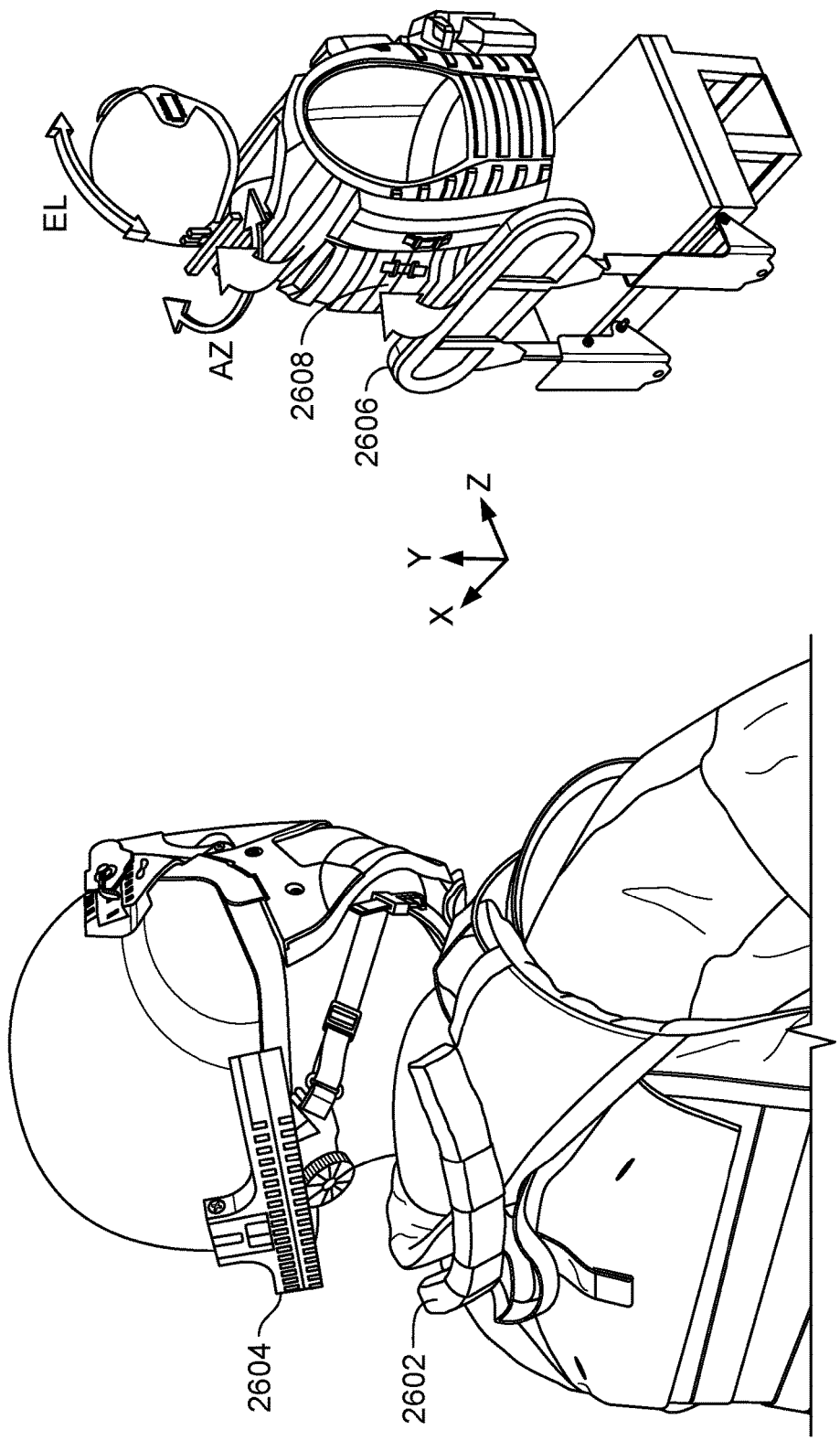
FIG. 26A is an image of an embodiment of a wireless energy transfer system as part of a vest and helmet.
FIG. 26B is an image of an embodiment of a wireless energy transfer system as part of a seat, vest, and helmet.

FIG. 26 shows an exemplary embodiment of a system that demonstrates the capability to transfer power wirelessly from a battery pack worn on a vest to a helmet mounted electronic device requiring a minimum of 2.5 W. This demonstration provided a DC-AC transfer efficiency near 60% (45%-48% DC-DC transfer efficiency) at optimal positioning with degrading performance for azimuth head rotation. In embodiments, the source mounted to the vest provides at least 5 W of power over the following range to a device mounted on a helmet: azimuthal angle range from 0°±40° and elevation range from 5 to 13 cm. In embodiments, the operating frequency is approximately 200 kHz. In embodiments, the operating frequency may be chosen to be a frequency other than the operating frequency of the seatback to vest power transmission system to avoid unintentional power provided to the helmet from the seatback source. In embodiments, the operating frequency may be chosen to be the same to simply system electronics, such as those converting power transmitted to the vest to be used for the helmet.

Electromagnetic studies were performed to target positional performance enhancement and ensure the viability of the system design. As part of this effort, the modeling and simulation results were evaluated with respect to compliance with applicable human exposure limits for Specific Absorption Rates (SARs), as delineated by ICNIRP, IEEE, and or FCC. Although initial studies focused on a 5 W system, the simulations have been performed to determine the practical upper limit of power transfer that could be implemented while complying with applicable FCC human exposure limits.

Figure 27:
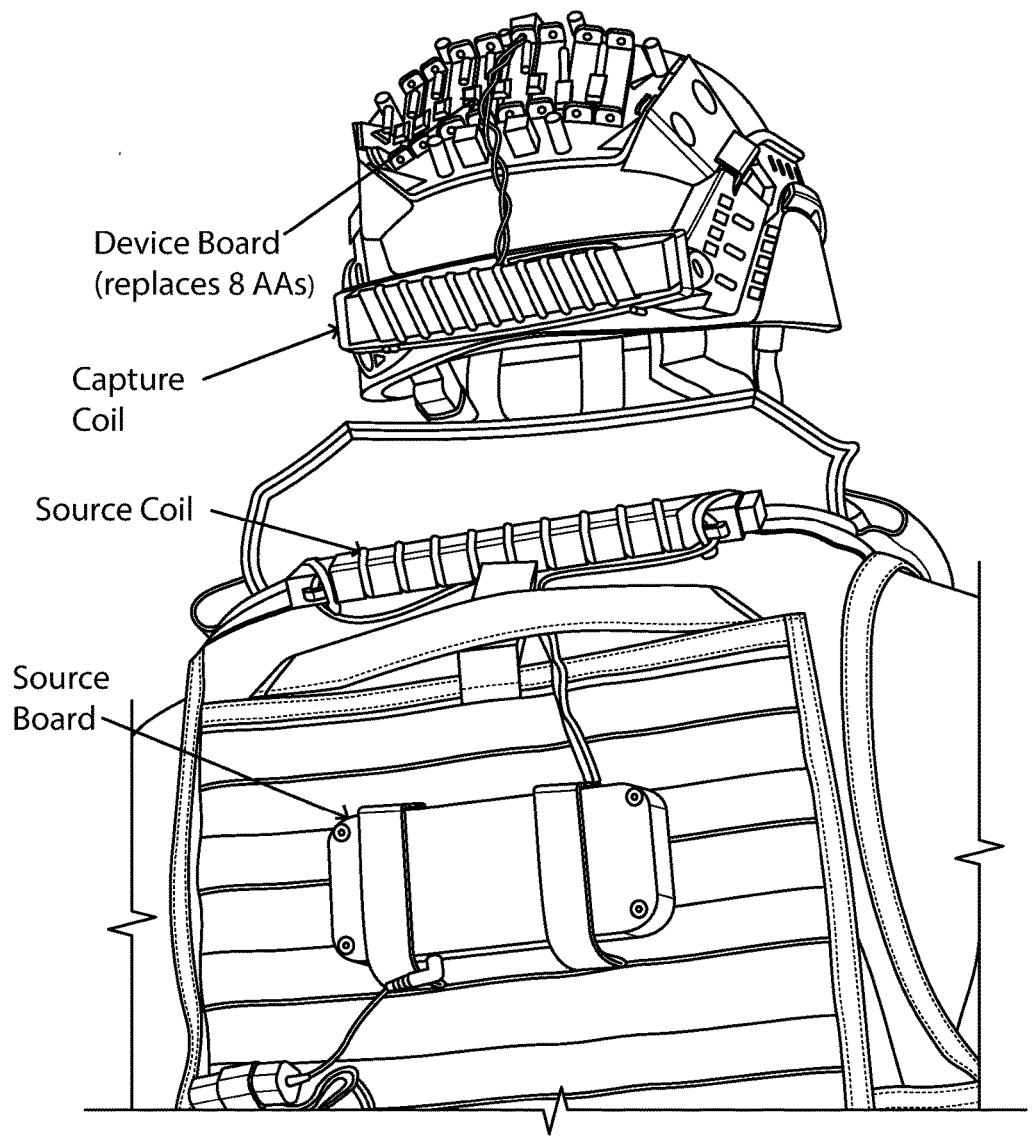
FIG. 27 is an image of an embodiment of a wireless energy transfer system in a vest and helmet.
Figure 28:
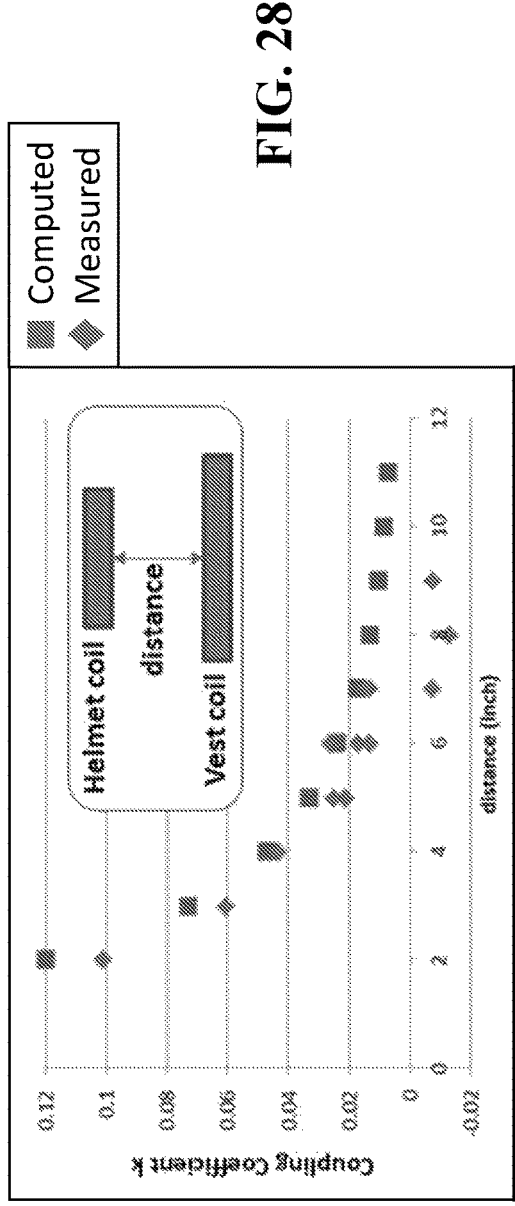
FIG. 28 is a plot of coupling as a function of distance between a helmet coil and vest coil for an embodiment of a wireless energy transfer system.
Figure 29:
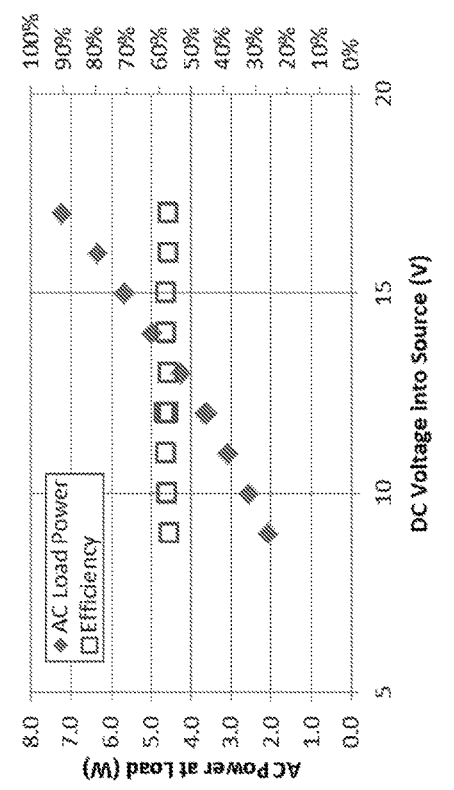
FIG. 29 is a plot of power at a load as a function of voltage into a source for the embodiment of the wireless energy transfer system of FIG. 28.

In exemplary embodiments, the source and device resonator coils have horizontally aligned dipole moments. FIG. 27 shows the device and source resonator coils on the mock soldier. FIG. 28 shows measured and computed values of the magnetic coupling coefficient for the embodiment shown in FIG. 27. Diamond symbols correspond to measured points and square symbols to computed points. FIG. 29 shows AC power delivered to a 35-ohm power resistor (diamond shapes) and DC-AC energy transfer efficiency (square shapes) for the embodiment shown in FIG. 27.

Magnetic Performance Improvements

Figure 30:
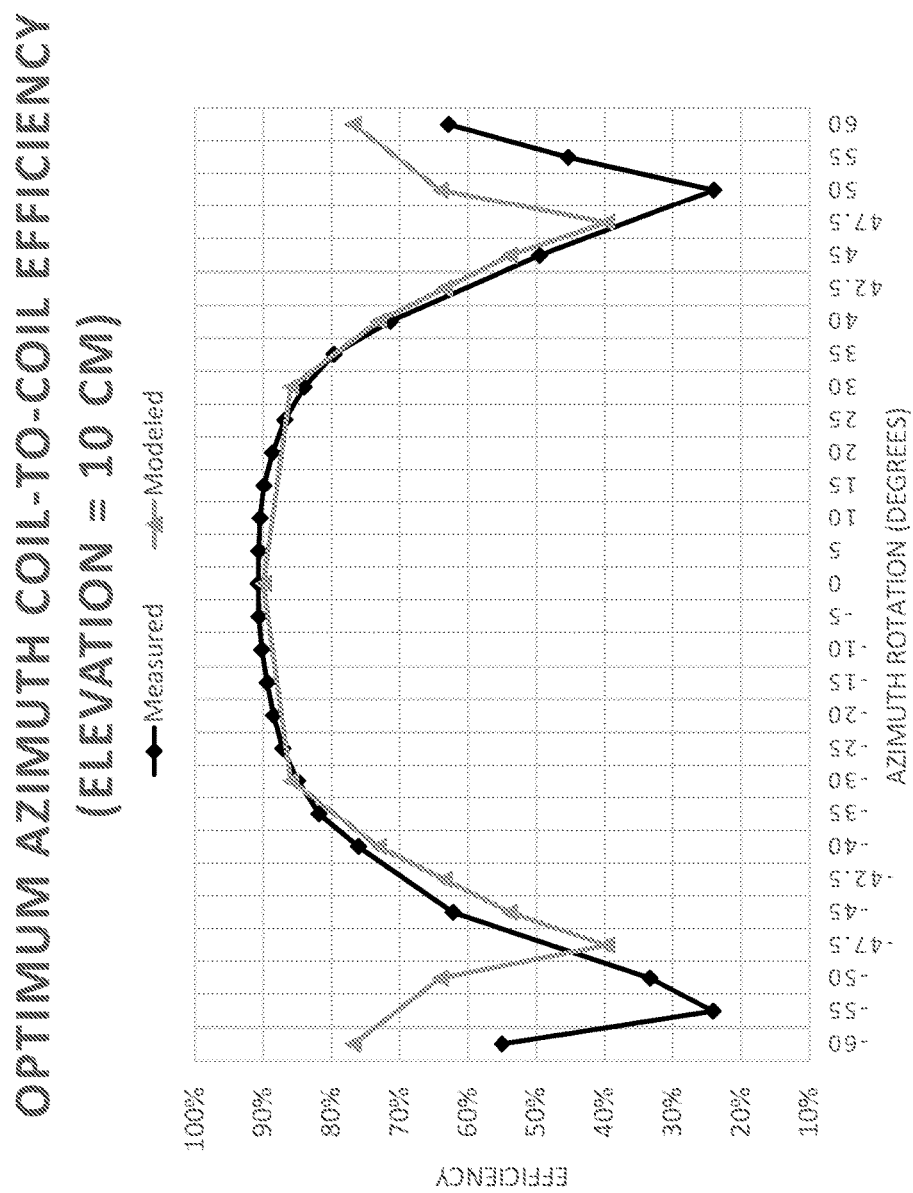
FIG. 30 is a plot of efficiency as a function of azimuth rotation for an embodiment of a wireless energy transfer system.

In FIG. 30, the results of the modeled and measured optimum coil-to-coil efficiencies are shown. The measured data correlates with the modeled data within the expected tolerances. For a radius of helmet rotation of 15 cm, the coupling k has a range 1%-5%. The Q of the source is 450 and the Q of the device is 390.

Since the application requires that the resonator coils be near the human body, it may be necessary to determine the impact of the body on the coil-to-coil performance. FIG. 31 demonstrates that when considering various design trades, the effect of the human body muscle for these types of resonator coils can be neglected. FIG. 31A shows that the efficiency using a human model is approximately 88.45%, which is a small decrease in efficiency without a human model (88.75%) as shown in FIG. 31B. This is useful in speeding up the simulation process to draw general conclusions about the trades. During the design trade optimization process, the one or more of the following assumptions may be made. In embodiments, metallic or lossy objects may be positioned away from the proximity of the source and device resonators. In embodiments, the operating frequency may be 250 kHz. In embodiments, the operating frequency may be greater than 250 kHz. In exemplary embodiment, the power delivered to the load is 5 W or greater. In embodiments, there is a distance of approximately 40 mm between the resonator in the helmet and a human head in the helmet. In embodiments, the source resonator may be positioned 5 mm, 10 mm, or greater from the human body.

In the interest of targeting a lighter and potentially smaller resonator for the device resonator (on the helmet), performance was evaluated as a function of various sizes and geometries of the device resonator. The evaluation resulted in a curved ferrite design for the helmet and vest. FIG. 32 shows an exemplary embodiment of a geometry of a resonator. This embodiment comprises a curved piece of magnetic material 3204 and a solenoidal coil 3202 wound around the magnetic material. FIG. 33 shows the mechanical dimensions of an exemplary embodiment of a curved piece of magnetic material. The curved piece has an arc angle of 83 degrees with a radius of curvature of approximately 155 mm and a thickness of approximately 10 mm (±0.3 mm).

When power transfer occurs between resonators with curved magnetic materials (e.g., curved ferrite), in some embodiments, the curved magnetic materials can have substantially similar radii of curvature. As used herein, two resonators have a substantially similar radii of curvature if the radii of curvature of their curved magnetic materials differ by less than 10%.

Figure 14C:
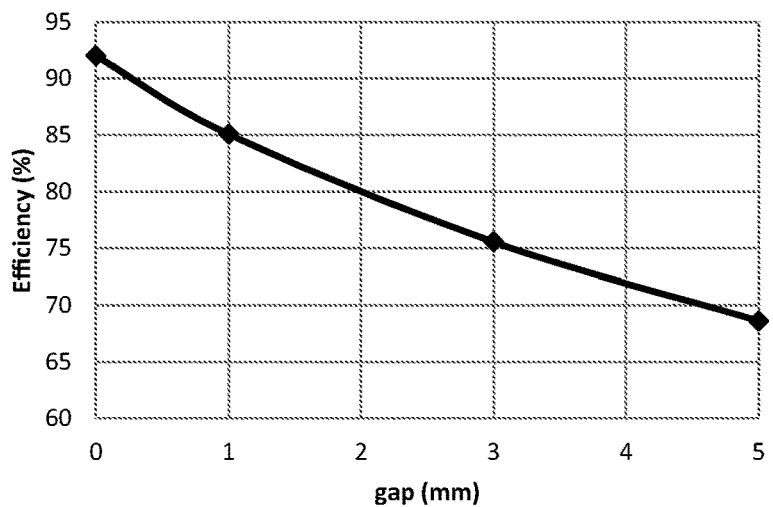
FIG. 14C is a plot showing efficiency as a function of gap between the wireless power source and device of FIG. 14A.

Highly Resonant Wireless Power Transfer (HRWPT) Helmet-Vest System and Performance An exemplary embodiment of a HRWPT helmet-vest system is shown in FIG. 14 with its associated measured specifications. A high level block diagram for a HRWPT system is shown in FIG. 10.

Each stage of the system has a power efficiency rating caused by losses in the stage. The Greek symbol η represents the efficiency of a given stage. Because quiescent currents do not change drastically as output power is increased, the quiescent efficiency ($\eta_{quiescent}$) will actually increase with power. For example, assuming there is a constant quiescent power draw of around 1 W, the quiescent efficiency for a 10 W power delivery would be about 91% whereas if the power delivery were 20 W, the quiescent efficiency would be about 95%. Note, however, that the quiescent power is required for both source and device electronics. The overall efficiency is calculated by multiplying the efficiency of each stage. Considering the same circumstance above where 1 W each is consumed by the source and device electronics, the total quiescent efficiency would be 83% for a 10 W power delivery and 91% for a 20 W delivery. This results in an 8% difference. Due to the low power delivery of the HRWPT system, the efficiency may not appear as high as systems delivering more power.

Figure 34:
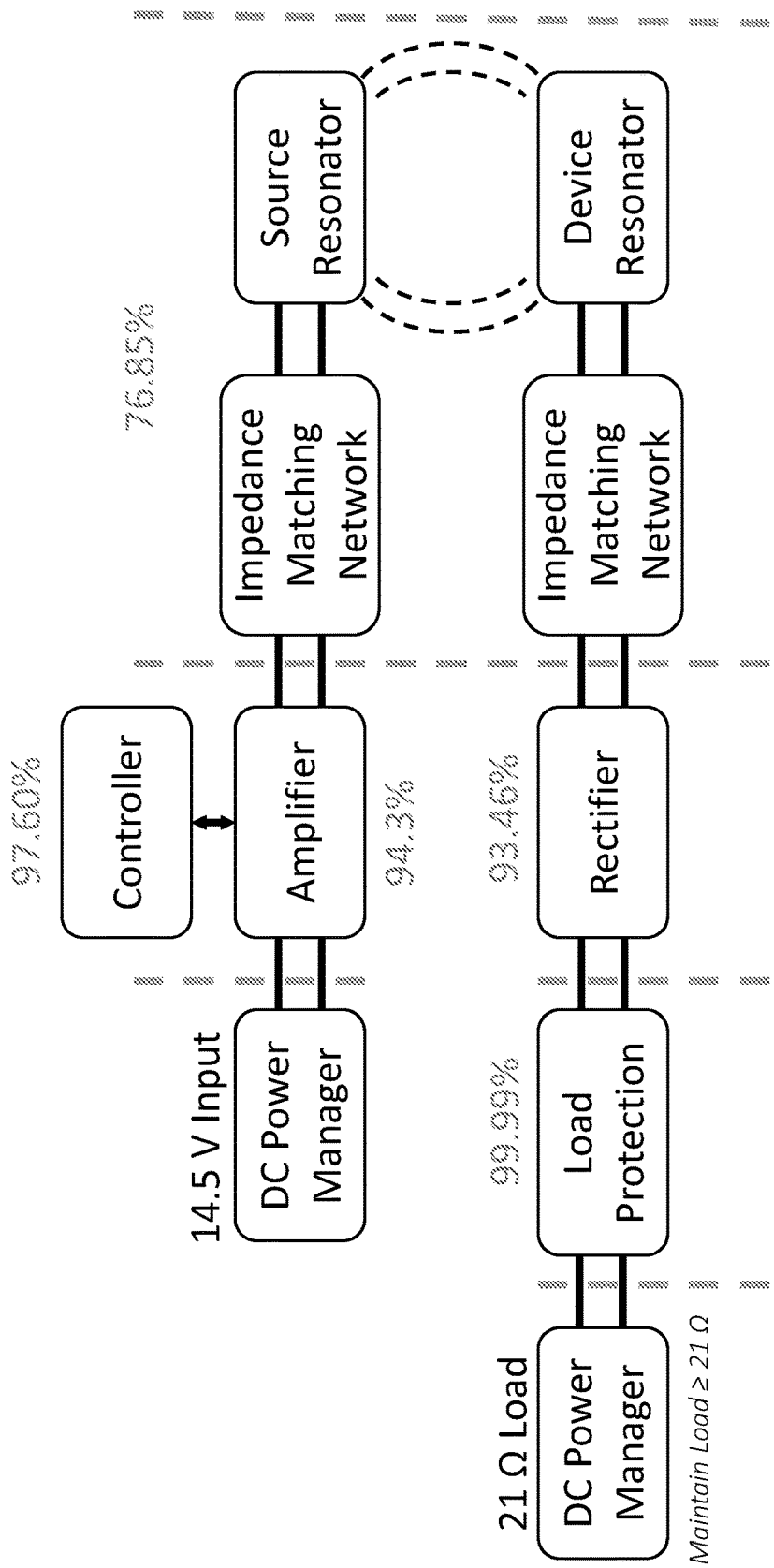
FIG. 34 is a schematic diagram of an embodiment of a wireless power transfer source.

Due to the multiplicative nature of the stages' efficiencies, it is advantageous to minimize quiescent losses and/or eliminate as many stages as possible. FIG. 34 shows the high level block diagram for the HRWPT helmet-vest system with the unnecessary stages removed and a breakdown of efficiencies based on measurements of electronic losses and overall end-to-end efficiency. Efficiencies are shown at a single operating point and will vary across operation. Efficiencies are approximated using measurements and end-to-end system efficiency calculations. For elevation of approximately 10 cm, azimuth of approximately 0° and output power of approximately 16.71 W, an approximate end-to-end efficiency of 66% was found for the system.

Figure 35:
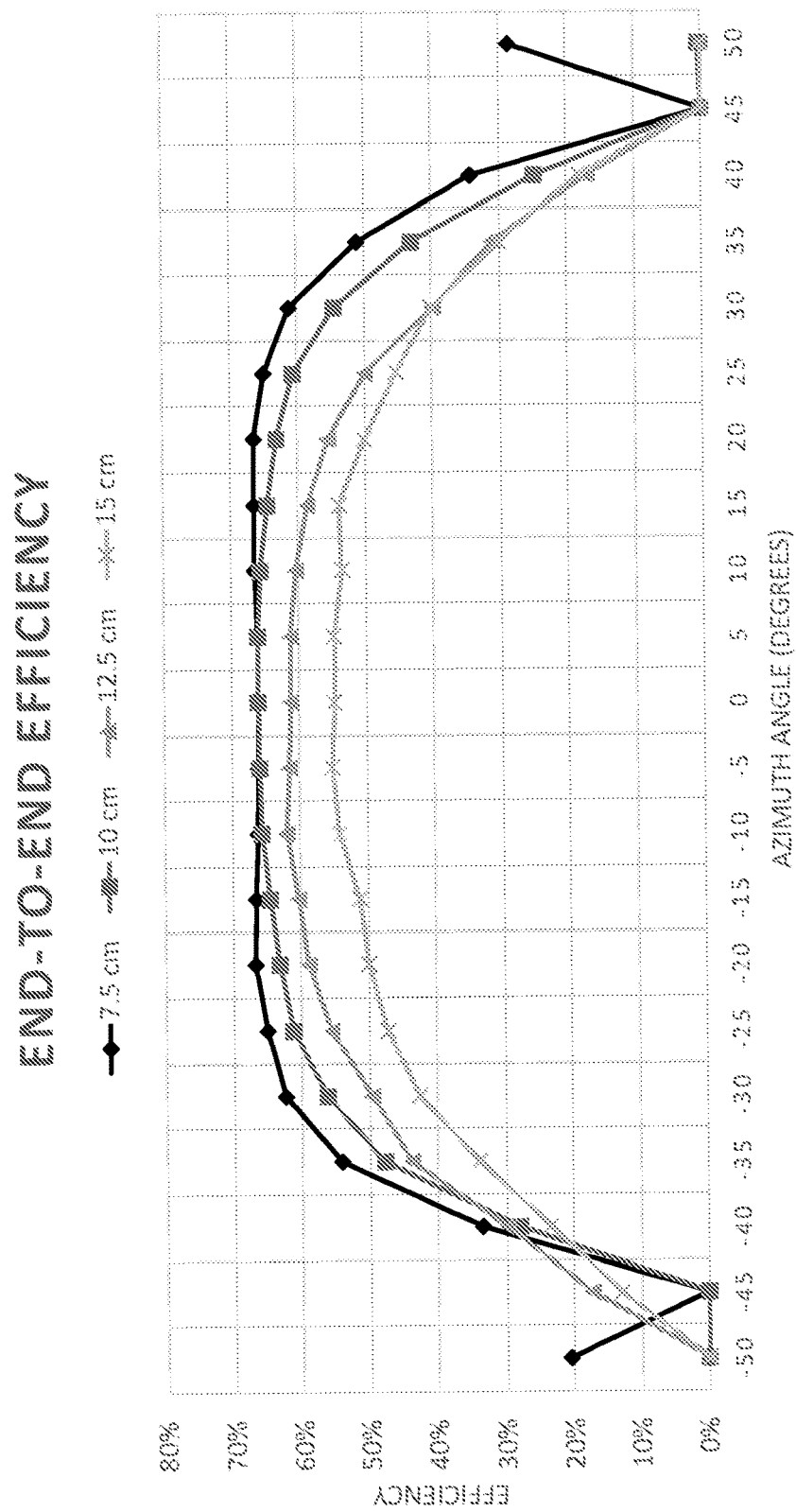
FIG. 35 is a plot of efficiency as function of azimuth angle for an embodiment of a wireless energy transfer system.
Figure 36:
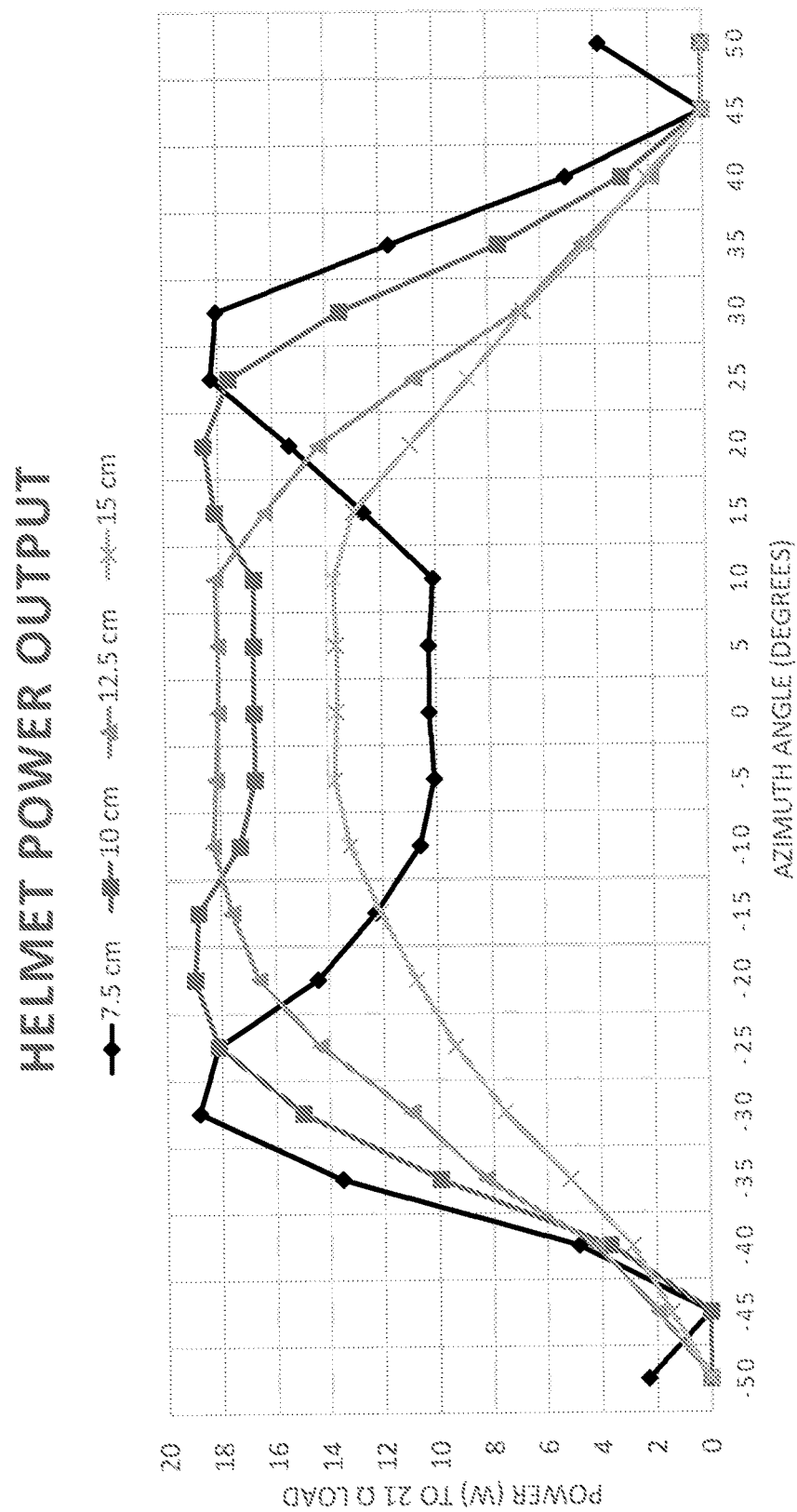
FIG. 36 is plot of power to a load function of azimuth angle for an embodiment of a wireless energy transfer system.

FIG. 35 shows a plot of end-to-end efficiency and FIG. 36 shows a plot of DC output power. FIG. 35 shows an approximate end-to-end efficiency of 66% with 10 cm of separation between resonators at 0° azimuth angle. FIG. 36 shows output power of 5 W over the azimuth rotation range of ±40° when elevation is less than or equal to 10 cm.

Figure 37:
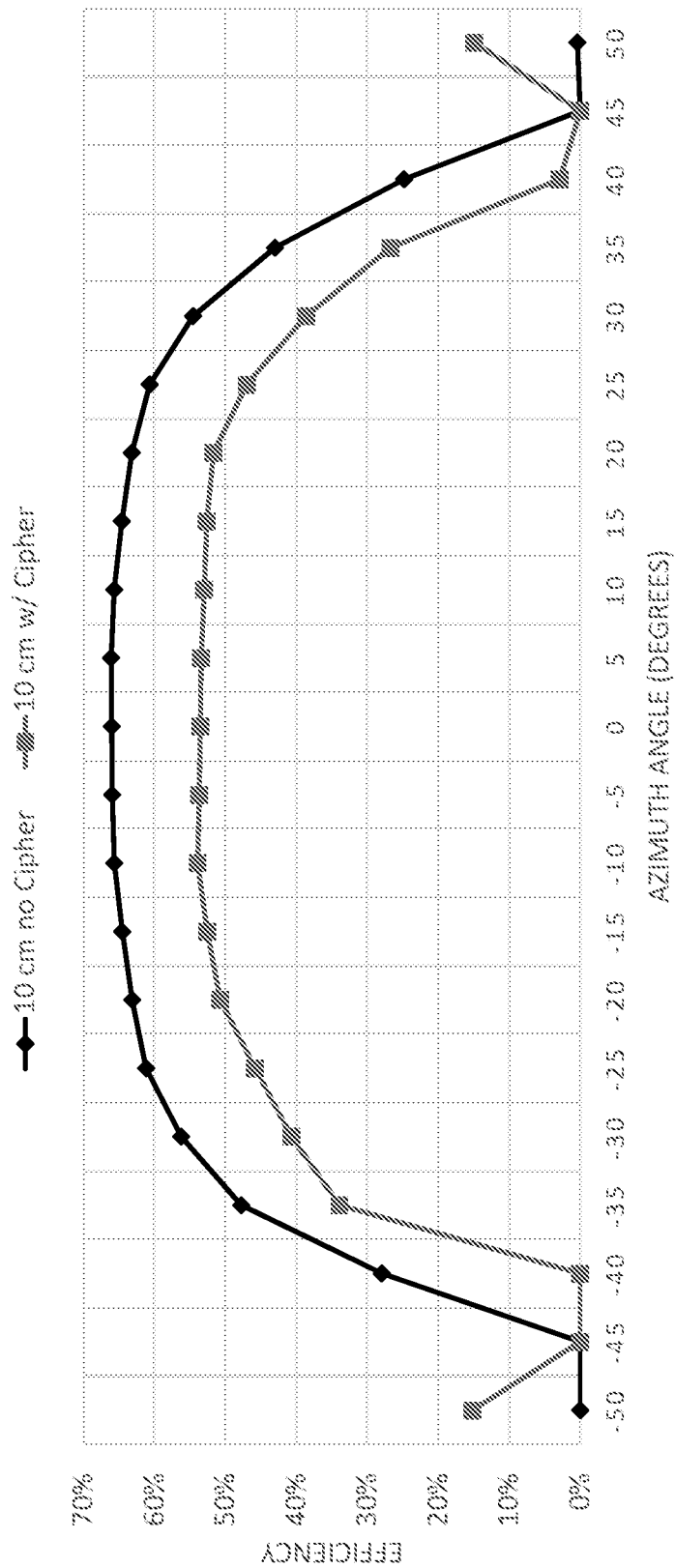
FIG. 37 is a plot of efficiency as a function of azimuth angle for an embodiment of a wireless energy transfer system.
Figure 38:
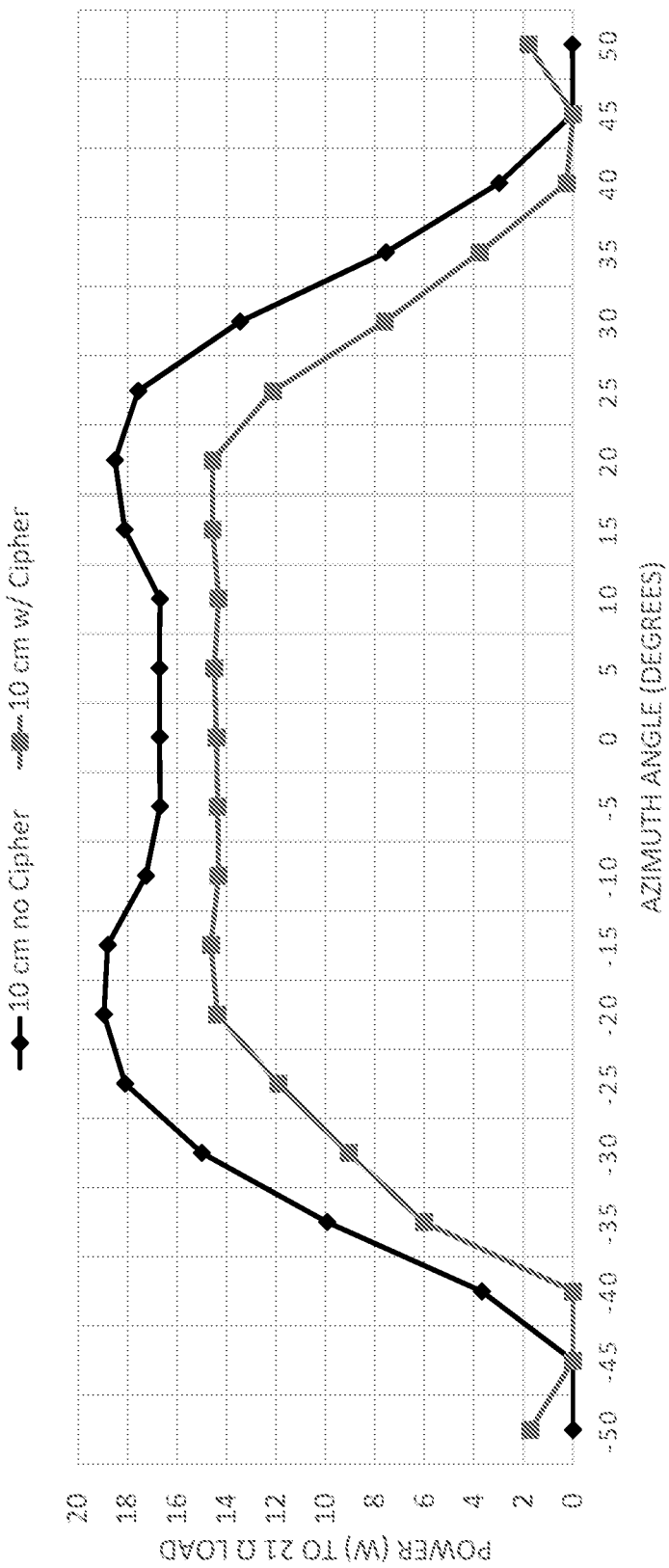
FIG. 38 is a plot of power to a load function of azimuth angle for an embodiment of a wireless energy transfer system.
Figure 39:
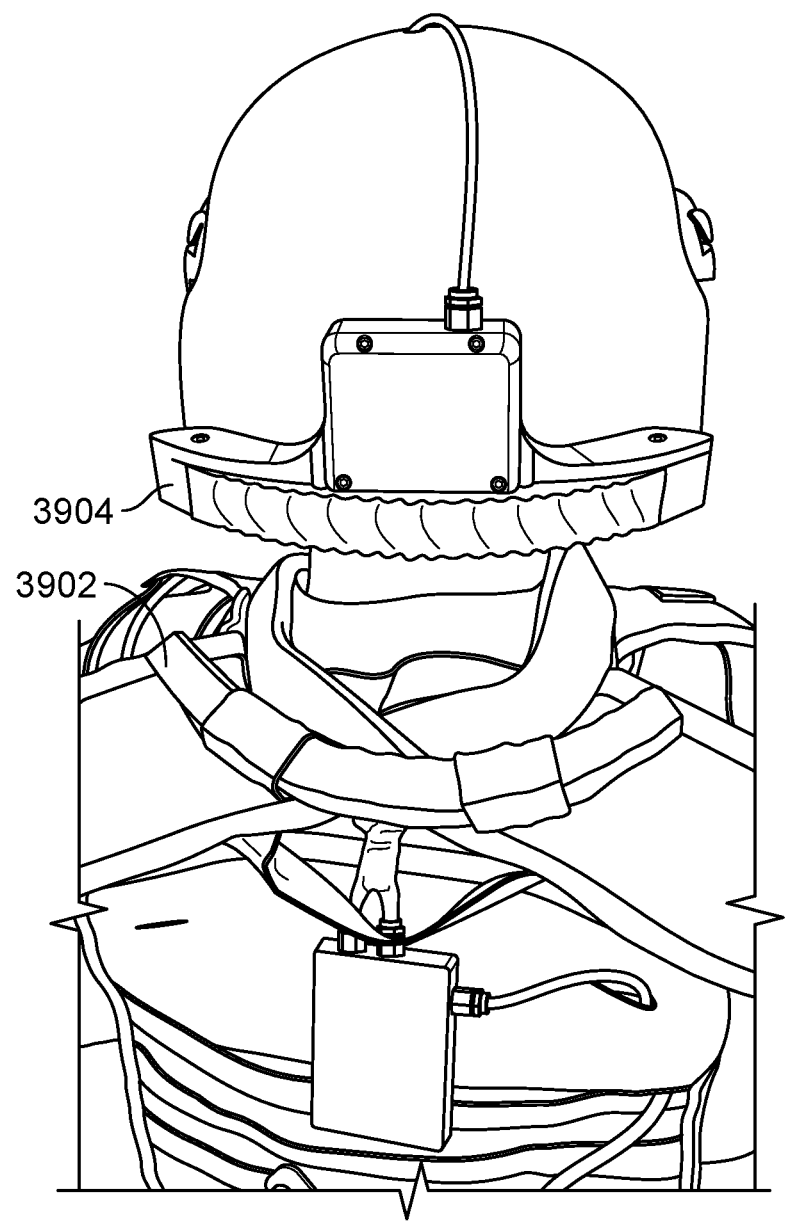
FIG. 39 is an image of an embodiment of a wireless power transfer system as part of a vest and helmet.

During testing of the HRWPT helmet system, it was determined that the type of helmet had a substantial impact on the efficiency of the magnetics. The impact on efficiency and performance was determined to be caused by a carbon fiber composite contained in this particular model of the helmet. The effects of the carbon fiber were characterized and are summarized in the FIGS. 37-38. The impacts of the helmet shown may be mitigated if an equivalent helmet without carbon fiber composite were used with the HRWPT helmet system. Note that for the designed HRWPT helmet-vest system, an optimum DC output load resistance of 21Ω was chosen. FIG. 39 shows pictures of the HRWPT helmet-vest system.

Modeling and simulation tools were utilized to explore and optimize the wireless efficiency and performance of the HRWPT helmet system for the specified range of operation. The modeling and simulation tools were also used to evaluate compliance with applicable human exposure limits for Specific Absorption Rates (SARs), as delineated by ICNIRP, IEEE, and/or FCC. The HRWPT helmet system was designed and tested. The end result was a highly efficient 200 kHz system capable of a minimum of 5 W over an azimuth angular movement of 0°±40° (80° total) and an elevation movement from 5 to 13 cm of resonator coil separation. Additional power can be obtained when operating at a smaller azimuth angle. The improvements in design also allow for a reduction in footprint of the various components of the system.

Note that article of clothing, gear, apparel, covering, and the like may be used interchangeably.

In exemplary embodiments, the power received by the device resonator on the vest from the source resonator on the seat may be used directly by the source resonator on the vest to provide power to the device resonator on the helmet. In embodiments, there may be a power manager that controls the power transferred from device resonator on the vest to the source resonator on the vest. The power transfer may be via a wired or wireless connection and the power manager may monitor, filter, and/or convert the power provided to the source resonator on the vest. In embodiments, the power manager may convert the frequency of power transfer in the seat-vest system to a different frequency in the vest-helmet system. For example, the frequency of power transfer in the seat-vest system may be 250 kHz, while the frequency of power transfer in the vest-helmet system may be 200 kHz.

In exemplary embodiments, the power received by the device resonator on the vest from the source resonator on the seat may be stored in a battery on the vest. In embodiments, there may be a power manager that monitors and controls the stored energy. This stored energy may be used by electronic devices on the vest or other clothing or it may be provided to the source resonator on the vest to wirelessly transfer power to the device resonator on the helmet. In embodiments, the power manager may monitor and control the power provided to the source resonator on the vest based on the electronic devices on the helmet. For example, night vision goggles may draw a different amount of power than another piece of equipment, such as an ear-piece. In embodiments, the battery may be optionally coupled to the power manager such that it may draw power directly from the device resonator (and associated electronics, such as a rectifier) on the vest or draw from a battery.

System Safety

Figure 40A:
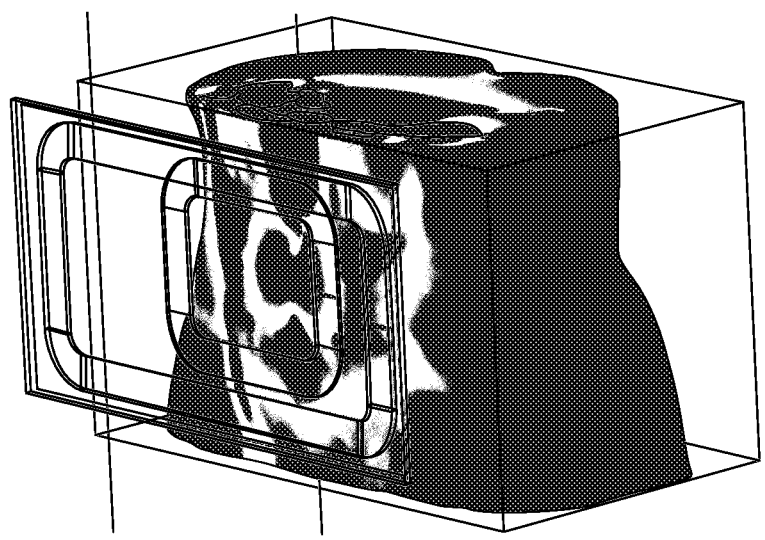
FIG. 40A is a schematic diagram of an embodiment of a wireless power transfer system near a model of a human body.
Figure 40B:
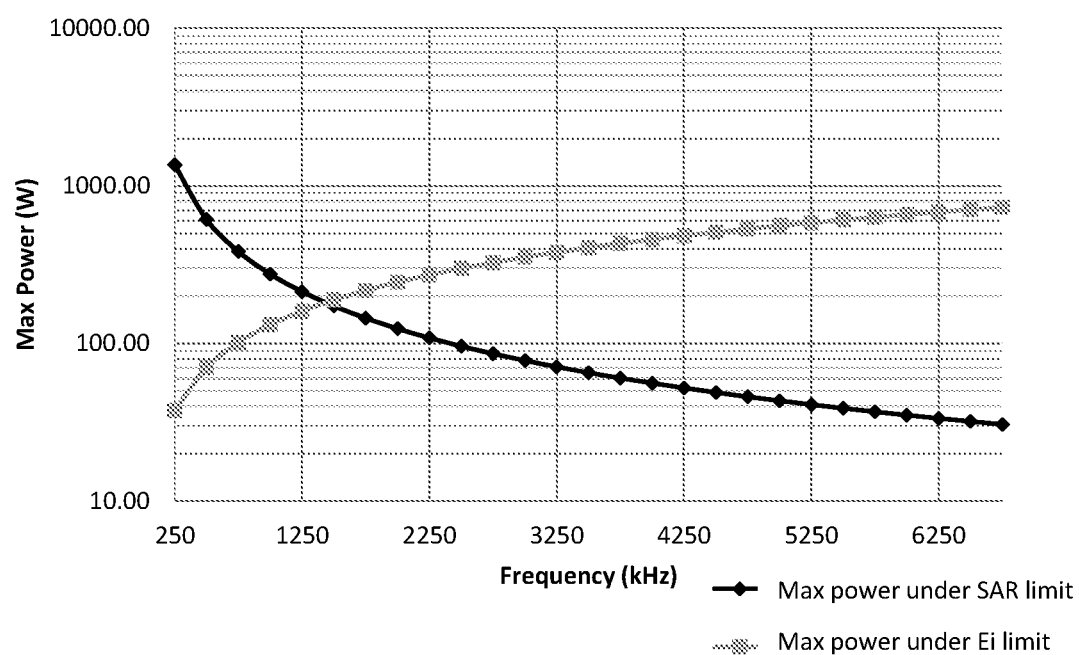
FIG. 40B is a plot of power as a function of frequency for the embodiment of FIG. 40A.

FIGS. 40A-40B show safety modeling of an exemplary embodiment of a seat to vest system. For the safety modeling shown in FIG. 40A, the resonator coil to body separation is 2.5 mm. FIG. 40B shows a plot of maximum power the source can transfer while staying under the SAR (black diamond data points) and/or electric field limits (gray square data points). The Specific Absorption Rate (SAR) at a power level of 10 W is 0.0118 W/kg. Note that the limit is 1.6 W/kg. The maximum power that can be transferred at the SAR limit is 1.35 kW. The Internal E-field (E) levels at 10 W is 17.4 V/m. Note that the limit is 33.75 V/m. The maximum power that can be transferred at the E limit is 37.6 W.

Figure 41A:
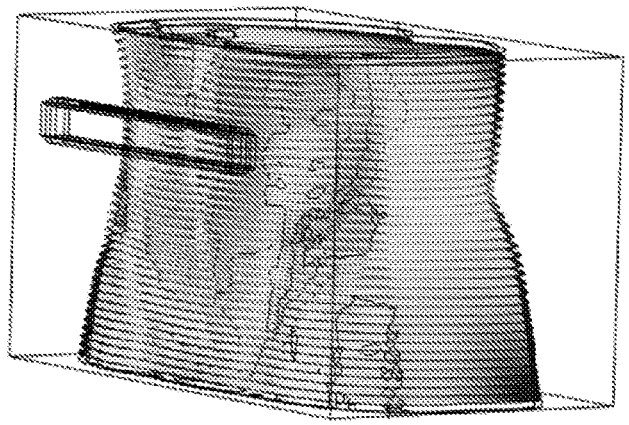
FIG. 41A is a schematic diagram of an embodiment of a wireless power transfer system near a model of a human body.
Figure 41B:
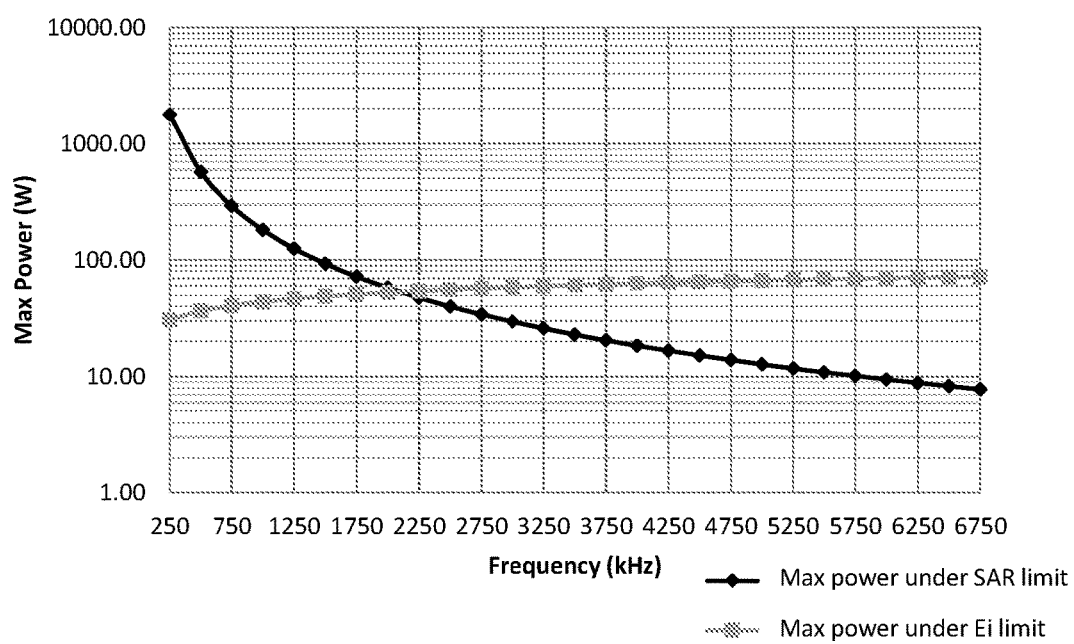
FIG. 41B is a plot of power as a function of frequency for the embodiment of FIG. 41A.

FIG. 41A-40B shows safety modeling of an exemplary embodiment of a vest to helmet system (at the vest side). For the safety modeling shown in FIG. 41A, the resonator coil to body separation is 5 mm. FIG. 41B shows a plot of maximum power the source can transfer while staying under the SAR (black diamond data points) and/or electric field limits (gray square data points). The Specific Absorption Rate (SAR) at a power level of 5 W is 0.0031 W/kg. Note that the limit is 1.6 W/kg. The maximum power that can be transferred at the SAR limit is 1.8 kW. The Internal E-field (E) levels at 5 W is 11.22 V/m. Note that the limit 33.75 V/m. The maximum power that can be transferred at the E limit is 29 W.

Figure 42A:
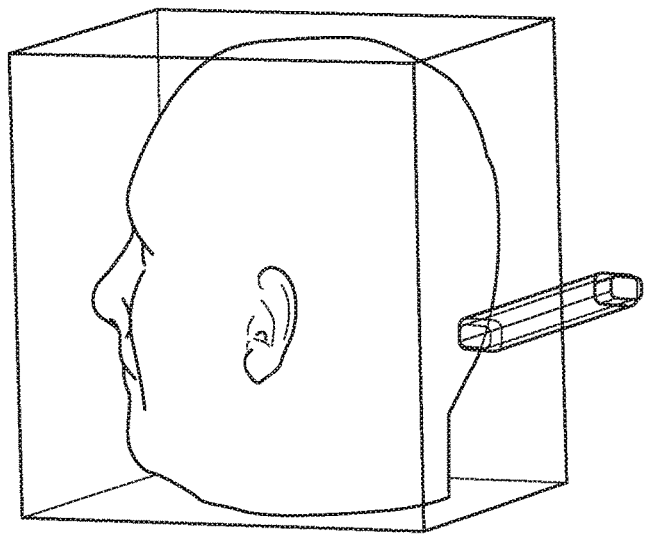
FIG. 42A is a schematic diagram of an embodiment of a wireless power transfer system near a model of a human body.
Figure 42B:
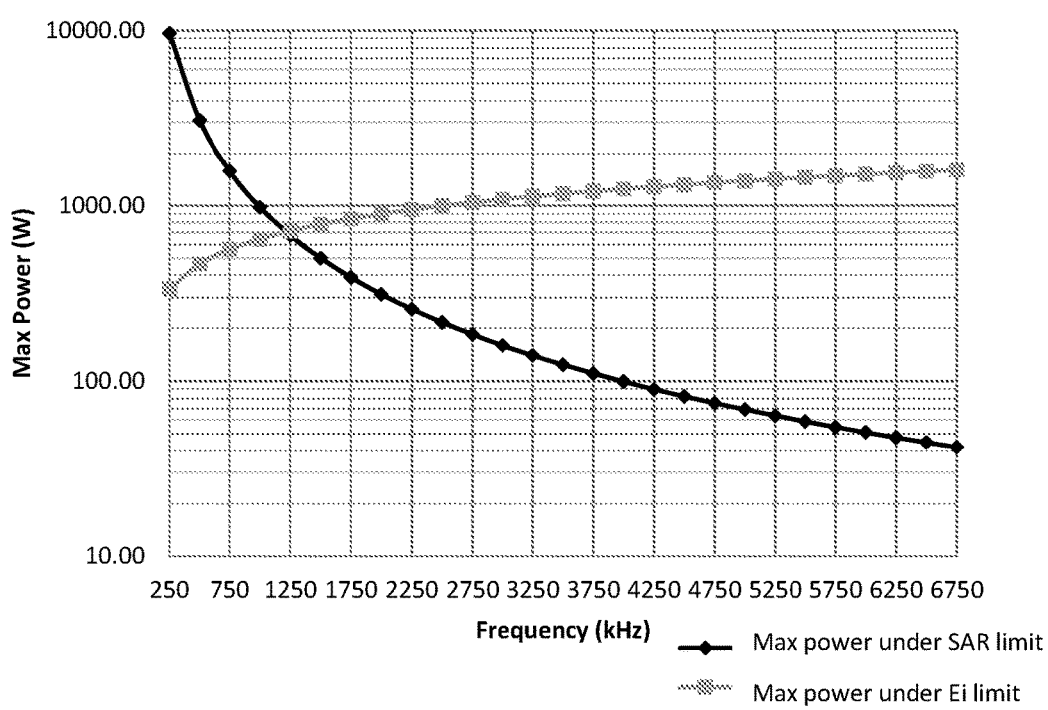
FIG. 42B is a plot of power as a function of frequency for the embodiment of FIG. 42A.

FIG. 42A-42B shows safety modeling of an exemplary embodiment of a vest to helmet system (at the helmet side). For the safety modeling shown in FIG. 42A, the resonator coil to body separation is 40 mm. The Specific Absorption Rate (SAR) at a power level of 5 W is 0.0006 W/kg. Note that the limit is 1.6 W/kg. The maximum power that can be transferred at the SAR limit is 9.6 kW. The Internal E-field (E) levels at 5 W is 3.47 V/m. Note that the limit 33.75 V/m. The maximum power that can be transferred at the E limit is 301 W.

While the invention has been described in connection with certain preferred embodiments, other embodiments will be understood by one of ordinary skill in the art and are intended to fall within the scope of this disclosure, which is to be interpreted in the broadest sense allowable by law. For example, designs, methods, configurations of components, etc. related to transmitting wireless power have been described above along with various specific applications and examples thereof. Those skilled in the art will appreciate where the designs, components, configurations or components described herein can be used in combination, or interchangeably, and that the above description does not limit such interchangeability or combination of components to only that which is described herein.

All documents referenced herein are hereby incorporated by reference.

What is claimed is:

1. An article configured to be worn on shoulders and an upper portion of a user's torso, comprising:
   at least one piece of material configured to conform to the shoulders and the upper portion of the user's torso;
   a first resonator attached to the at least one piece of material and comprising a conductive coil formed by a plurality of planar loops each positioned in a first plane to define a dipole moment for the first resonator that is aligned orthogonal to the first plane, wherein the first resonator is configured to wirelessly receive electrical power from an oscillating magnetic field;

a battery attached to the at least one piece of material;

an electrical apparatus attached to the at least one piece of material and coupled to the first resonator and the battery, and configured to store energy in the battery in response to the electrical power wirelessly received by the first resonator; and a second resonator coupled to the battery and configured to transmit electrical power by generating an oscillating magnetic field using power from the battery, wherein the second resonator is attached to the at least one piece of material at a location proximal to an opening in the at least one piece of material configured to at least partially surround a neck of the user; and wherein the second resonator comprises a helical coil comprising a plurality of loops of conductive material that extend along an arc-shaped helical axis.

2. The article of claim 1, wherein the article is a vest.

3. The article of claim 1, wherein the second resonator further comprises an arc-shaped magnetic material with an opposite pair of surfaces of concave and convex curvature, respectively.

4. The article of claim 3, wherein a thickness of the magnetic material in a radial direction is substantially constant.

5. The article of claim 1, wherein the second resonator further comprises a magnetic material core formed by at least three pieces of magnetic material, and wherein the at least three pieces of magnetic material are aligned along the arc-shaped helical axis.

6. The article of claim 5, wherein each of the at least three pieces of magnetic material has a linear central axis.

7. The article of claim 6, wherein each of the at least three pieces of magnetic material are aligned so that the central axes of adjacent pieces of magnetic material intersect to include an obtuse angle.

8. The article of claim 5, wherein one or more pairs of adjacent surfaces of the at least three pieces of magnetic material are beveled.

9. The article of claim 1, wherein the second resonator is configured to transmit electrical power to a third resonator disposed on or in a member spatially separated from the second resonator.

10. The article of claim 9, wherein a coil-to-coil efficiency of power transfer between the second and third resonators is 40% or greater.

11. The article of claim 9, wherein a quality factor of each of the second and third resonators is greater than 100.

12. The article of claim 1, wherein the second resonator is enclosed within a sleeve attached to the at least one piece of material.

13. The article of claim 12, wherein the sleeve forms at least a portion of a collar of the article.

14. A wireless power transfer system, comprising:
the article of claim 9; and
the member comprising the third resonator,
wherein the third resonator comprises a helical coil comprising a plurality of loops of conductive material that extend along a second arc-shaped helical axis.

15. The system of claim 14, wherein the second and third resonators have a substantially similar radius of curvature.

16. The system of claim 14, wherein the member is configured to be worn on a head of the user.

17. The system of claim 16, wherein the member is a helmet.

18. The system of claim 16, wherein the helical coil of the third resonator is positioned on a surface of the member proximal to a neck of the user.

19. The system of claim 14, wherein the third resonator comprises an arc-shaped magnetic material with an opposite pair of surfaces of concave and convex curvature, respectively.

20. The system of claim 14, wherein the third resonator comprises a magnetic material core formed by at least three pieces of magnetic material that are aligned along the second arc-shaped helical axis.

* * * * *

UNITED STATES PATENT AND TRADEMARK OFFICE
CERTIFICATE OF CORRECTION

PATENT NO. : 9,948,145 B2  
APPLICATION NO. : 14/587597  
DATED : April 17, 2018  
INVENTOR(S) : Kylee D. Sealy et al.

It is certified that error appears in the above-identified patent and that said Letters Patent is hereby corrected as shown below:

Column 1  
Line 17, before "TECHNICAL FIELD" insert the following:  
--UNITED STATES GOVERNMENT RIGHTS  
This invention was made with support from the Federal government under Grant No. W911QY-13-C-0078, awarded by the Natick Soldier Research and Development Engineering Center. The Government may have rights in the invention.--

Signed and Sealed this  
Twenty-ninth Day of May, 2018

Andrei Iancu  
*Director of the United States Patent and Trademark Office*